US012728968B2

(12) United States Patent
Bae et al.

(10) Patent No.: US 12,728,968 B2
(45) Date of Patent: Sep. 8, 2026

(54) DEVICE AND METHOD FOR SENSING AND CORRECTING MARINE TRANSPORTATION ENVIRONMENT OF SHIP

(71) Applicant: WILLOG CO., LTD., Seoul (KR)

(72) Inventors: Sunghoon Bae, Seoul (KR); Jihyun Yun, Seoul (KR); Jaehwan Kim, Seoul (KR)

(73) Assignee: WILLOG CO., LTD., Seoul (KR)

( * ) Notice: Subject to any disclaimer, the term of this patent is extended or adjusted under 35 U.S.C. 154(b) by 0 days.

(21) Appl. No.: 19/128,709

(22) PCT Filed: Nov. 10, 2023

(86) PCT No.: PCT/KR2023/018063

§ 371 (c)(1),
(2) Date: May 9, 2025

(87) PCT Pub. No.: WO2024/101946

PCT Pub. Date: May 16, 2024

(65) Prior Publication Data

US 2026/0008526 A1 Jan. 8, 2026

(30) Foreign Application Priority Data

Nov. 10, 2022 (KR) ........................ 10-2022-0149744
Nov. 9, 2023 (KR) ........................ 10-2023-0154923
Nov. 9, 2023 (KR) ........................ 10-2023-0154926

(51) Int. Cl.
*B63B 79/40* (2020.01)
*B63B 79/15* (2020.01)
*G01C 21/20* (2006.01)

(52) U.S. Cl.
CPC .............. *B63B 79/40* (2020.01); *B63B 79/15* (2020.01); *G01C 21/203* (2013.01); *B63B 2213/02* (2013.01)

(58) Field of Classification Search
None
See application file for complete search history.

(56) References Cited

U.S. PATENT DOCUMENTS

2015/0149135 A1* 5/2015 Tervo .................... G05B 17/02 703/8

FOREIGN PATENT DOCUMENTS

KR 10-0970254 B1 7/2010
KR 10-1074907 B1 10/2011

(Continued)

OTHER PUBLICATIONS

Korean Intellectual Property Office Request for the Submission of an Opinion for KR 10-2023-0154923 dated Feb. 20, 2024.

(Continued)

*Primary Examiner* — Anshul Sood
(74) *Attorney, Agent, or Firm* — Sughrue Mion, PLLC

(57) ABSTRACT

This disclosure relates to a device and method for sensing and correcting a marine transport environment of a ship. According to one embodiment, the disclosed device comprises a processor that: receives sensing information regarding temperature and humidity inside a cargo on the ship from an external source, verifies the temperature and the humidity of the sensing information based on at least one of a GPS indicating a location of the ship and an ETA at a destination of the ship along a navigation route, and corrects transport environment information including the temperature and the humidity based on the verification results.

9 Claims, 18 Drawing Sheets

(56) References Cited

FOREIGN PATENT DOCUMENTS

| | | | |
|---|---|---|---|
| KR | 10-2018-0104213 | A | 9/2018 |
| KR | 10-2019-0000326 | A | 1/2019 |
| KR | 10-1963305 | B1 | 3/2019 |
| KR | 10-2021-0066698 | A | 6/2021 |
| KR | 10-2022-0090301 | A | 6/2022 |
| WO | 2016/181543 | A1 | 11/2016 |

OTHER PUBLICATIONS

Korean Intellectual Property Office Written Decision on Registration for KR 10-2023-0154923 dated Aug. 28, 2024.

International Search Report for PCT/KR2023/018063 dated Mar. 5, 2024 (PCT/ISA/210).

* cited by examiner

DEVICE AND METHOD FOR SENSING AND CORRECTING MARINE TRANSPORTATION ENVIRONMENT OF SHIP

FIELD OF THE INVENTION

The present disclosure relates to an electronic device and method, and more specifically, to a method for sensing and correcting the marine transport environment using a data logger. This method involves additional sensing of unique physical quantities within the marine transport environment utilizing a One-Time QR-code (OTQ) and correcting conditions that cause abnormal values.

Furthermore, the present disclosure relates an to electronic device and method, and more specifically, to a system and method for detecting gas leakage caused by battery damage while the ship is transporting cargo at sea using an artificial intelligence (AI) model and responding to the detected gas leakage.

BACKGROUND OF THE RELATED ART

With advancements in technology and industry, distribution networks are continuously expanding, making the storage and transportation conditions of goods during distribution a crucial factor. In particular, when transporting high-value products such as large-capacity batteries, damage due to high temperatures, vibrations, and humidity can lead not only to the destruction of a single product but also to a chain reaction affecting other goods stored in the same environment. For high-precision products, transport is carried out using vibration-free vehicles, while refrigerated food products require precise control of temperature and humidity throughout the transportation process.

Such high-value products require a logistics environment different from that of lower-value products. Managing transportation quality to prevent damage or loss of goods is of utmost importance in logistics management. Various devices and methods have been applied to improve transportation through efficiency technological advancements. However, even for high-value products, monitoring for product deterioration or damage due to heat, vibration, and humidity during transport remains insufficient, creating the need for a more efficient and systematic transportation quality management system.

SUMMARY OF THE INVENTION

The embodiments disclosed in the present disclosure aim to establish a system for accurately estimating the transportation environment by verifying and correcting transportation conditions based on GPS and Estimated Time of Arrival (ETA).

Additionally, the embodiments of the present disclosure aim to build a system that includes a virtual sensor to replace actual gas sensors.

In one aspect, a system for detecting abnormal conditions of a battery contained in a ship's marine transport environment includes: a neural network processor that generates an AI model trained on pattern changes in temperature and humidity within an enclosed space based on sensing data generated from a sensing device; and a virtual sensing processor that detects gas leakage from the battery corresponding to changes in temperature and humidity based on the AI model and the sensing data received from the ship.

In another aspect, a method for sensing and correcting the marine transport environment of a ship includes: a step of generating an AI model trained on pattern changes in temperature and humidity within an enclosed space based on sensing data; and a gas detection step of detecting gas leakage from the battery corresponding to temperature and humidity changes based on the AI model and the sensing data received from the ship.

Additionally, a computer-readable recording medium storing a computer program for executing the disclosed method may be provided.

Furthermore, a computer program stored in a recording medium, executable in conjunction with hardware, may also be provided to implement the disclosed method.

The problems addressed by the present disclosure are not limited to those explicitly mentioned above, and additional problems will be apparent to those skilled in the art based on the following description.

To achieve the above-mentioned technical objectives, a device for sensing and correcting the marine transport environment of a ship, according to one aspect of the present disclosure, includes: an inertial sensor that measures the roll of the ship; and a processor that receives sensing information on the temperature and humidity inside the cargo contained in the ship from an external source, verifies the temperature and humidity based on at least one of the GPS location of the ship and the ETA of the ship on its route, and corrects the transportation environment information, including temperature and humidity, based on the verification results.

A method for sensing and correcting the marine transport environment of a ship, according to another aspect of the present disclosure, includes: a sensing information reception step of receiving sensing information on the temperature and humidity inside the cargo contained in the ship from an external source; a measurement step of measuring the roll of the ship; a verification step of verifying the temperature and humidity based on at least one of the GPS location of the ship and the ETA of the ship along its travel route; and a correction step of correcting the transportation environment information, including temperature and humidity, based on the verification results.

Additionally, a computer-readable recording medium storing a computer program for executing the disclosed method may be provided.

Furthermore, a computer program stored in a recording medium, executable in conjunction with hardware, may also be provided to implement the disclosed method.

According to the above-described means of the present disclosure, the invention provides the effect of accurately estimating the transportation environment, thereby enhancing user convenience and reliability.

Moreover, by introducing a virtual sensor to replace actual gas sensors, the disclosed invention provides the effects of reducing manufacturing costs, improving the accuracy of gas sensing, and enhancing user convenience and reliability.

The effects of the present disclosure are not limited to those explicitly mentioned above, and additional effects will be apparent to those skilled in the art based on the following description.

DETAILED DESCRIPTION OF THE PREFERRED EMBODIMENT

Figure 1:
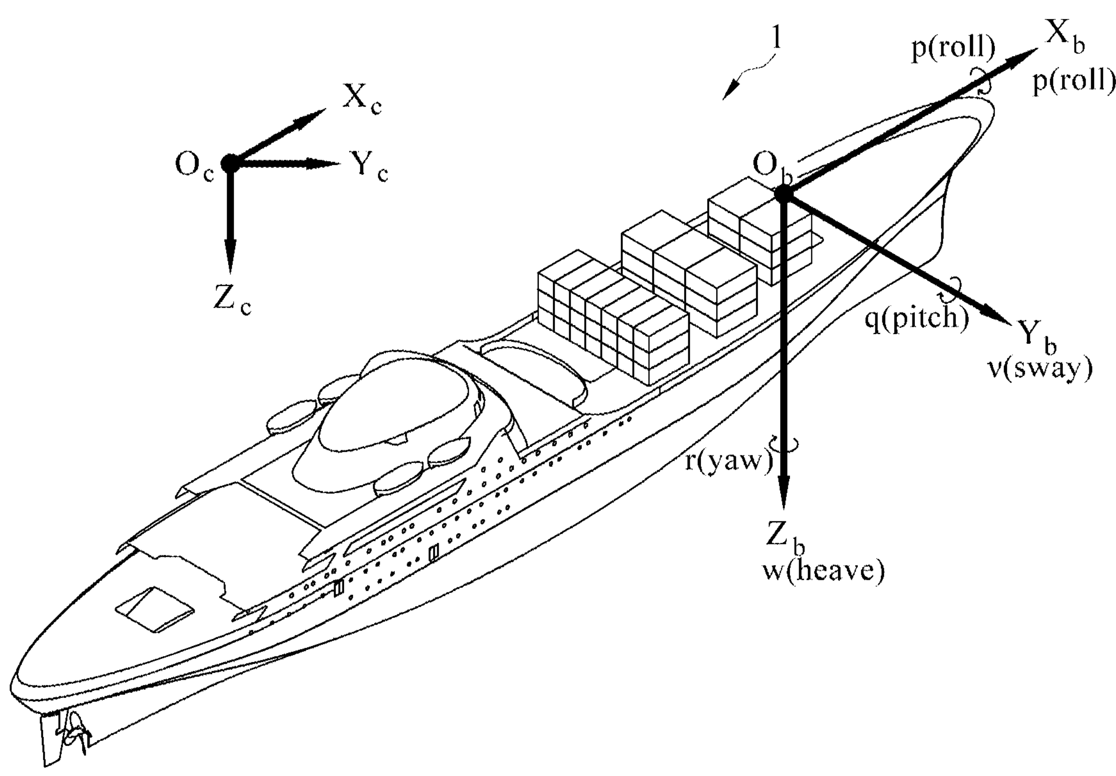
FIG. 1 is an exemplary diagram illustrating a ship according to the present disclosure.

Throughout this disclosure, the same reference numerals denote the same components. This disclosure does not describe all elements of the embodiments, and general knowledge in the technical field or overlapping content among embodiments is omitted. The terms 'unit,' 'module,' 'member,' and 'block' used in the specification can be implemented in software or hardware. Depending on the embodiments, multiple 'units,' 'modules,' 'members,' or 'blocks' may be integrated into a single component, or a single 'unit,' 'module,' 'member,' or 'block' may include multiple components.

Throughout the specification, when a certain part is said to be "connected" to another part, this includes not only direct connections but also indirect connections through a wireless communication network.

Furthermore, when a part is said to "include" a certain component, unless explicitly stated otherwise, it does not exclude other components but may further include additional components.

Throughout the specification, when a member is said to be "on" another member, this includes both cases where it is in direct contact and where another member exists in between.

The terms 'first,' 'second,' and so on are used to distinguish one component from another and do not limit the components to specific characteristics. Singular expressions include plural forms unless explicitly stated otherwise.

For each step, the reference numerals are used for convenience in explanation and do not indicate a specific sequence of the steps unless explicitly stated. The steps may be performed in a different order than specified unless the context dictates a specific sequence.

The principles and embodiments of this disclosure will now be described with reference to the attached drawings.

1. Embodiment 1

This embodiment describes a device and method for sensing and correcting the maritime transport environment of a ship.

In this specification, the "device according to this disclosure" includes various devices capable of performing computational processing and providing results to the user. For example, such devices may include computers, server devices, and portable terminals.

A computer, for example, may include laptops, desktops, notebooks, tablet PCs, and slate PCs equipped with a web browser.

A server device may be a server that processes information through communication with external devices, including an application server, computing server, database server, file server, game server, mail server, proxy server, or web server.

A portable terminal may include any handheld wireless communication device with portability and mobility, such as PCS (Personal Communication System), GSM (Global System for Mobile Communications), PDC (Personal Digital Cellular), PHS (Personal Handyphone System), PDA (Personal Digital Assistant), IMT-2000 (International Mobile Telecommunication-2000), CDMA-2000 (Code Division Multiple Access-2000), W-CDMA (Wideband Code Division Multiple Access), WiBro (Wireless Broadband Internet) terminals, smartphones, as well as wearable devices such as smartwatches, rings, bracelets, anklets, necklaces, glasses, contact lenses, and head-mounted devices (HMDs).

FIG. 1 illustrates a ship according to this disclosure.

Referring to FIG. 1, the ship 1 moves from a departure point to a destination along a predetermined route at sea. For instance, the ship 1 may move in a first direction (Xc) and/or a second direction (Yc) from a first central coordinate (Oc) and may also move in a third direction (Zc) due to external influences such as waves. While moving, the ship 1 may be affected by external factors such as waves, wind, gravity, and geomagnetism, causing pitch (pitching), yaw (yawing), and roll (rolling) . . . . Furthermore, the ship 1 may transport various cargo, shifting its center of gravity and causing oscillations due to the cargo's weight.

For example, based on a second central coordinate (Ob), surge (u) and roll (p) may occur along the first direction (Xb), sway (v) and pitch (q) may occur along the second direction (Yb), and heave (w) and yaw (r) may occur along the third direction (Zb). The ship 1 may have six or more degrees of freedom. Cargo may be included in the ship's transport space, which may refer to spaces such as container boxes, reefer containers, and liners.

Figure 2:
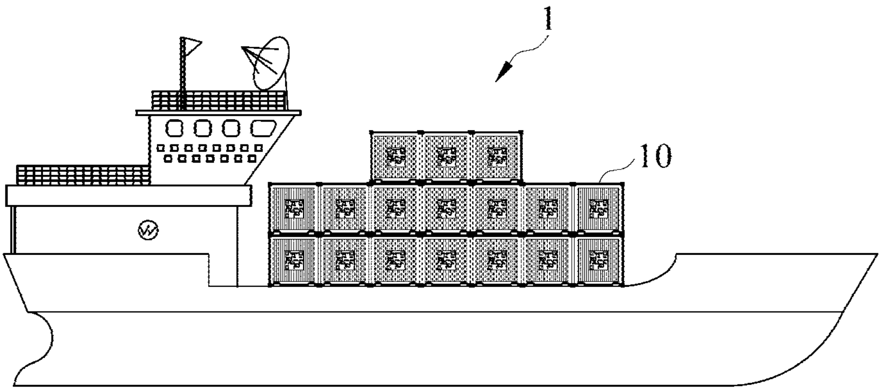
FIG. 2 is an exemplary diagram illustrating cargo contained in the ship according to the present disclosure.

FIG. 2 illustrates cargo included in a ship according to this disclosure.

Referring to FIG. 2, the ship 1 may include at least one piece of cargo. The cargo may include a device for estimating cargo transport information and ship information. Such a device may be referred to as a tracker or environmental information estimation device.

Figure 3A:
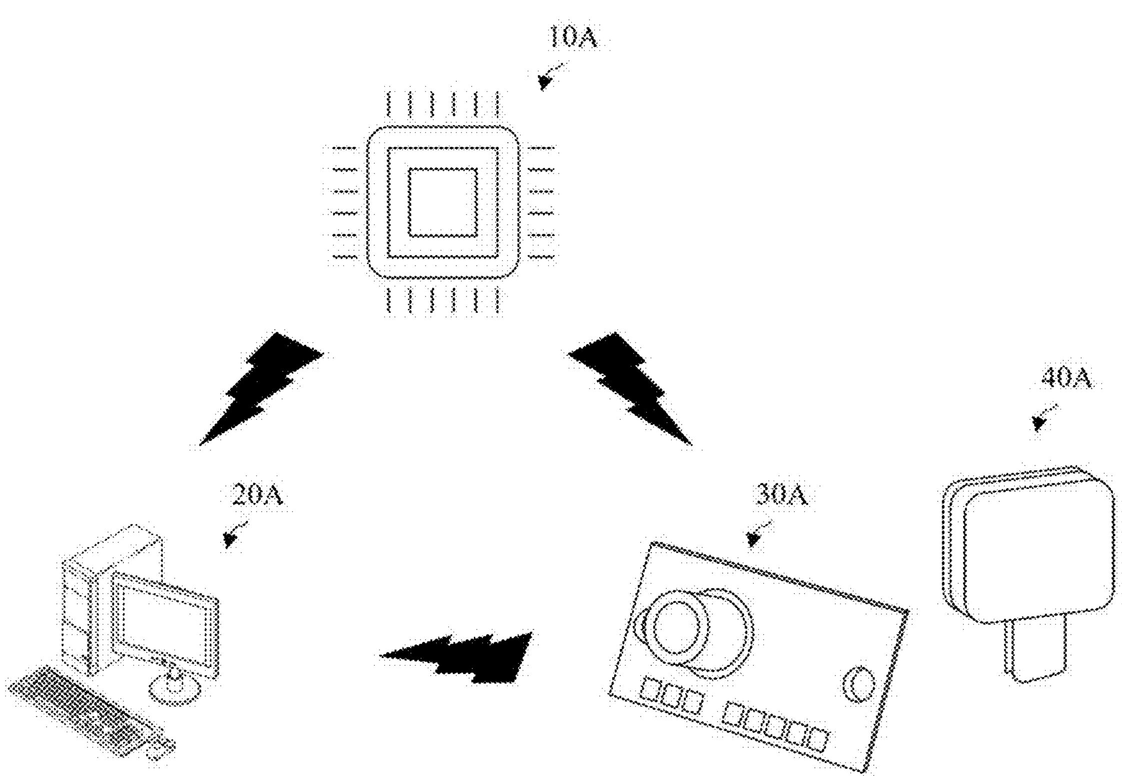
FIGS. 3A and 3B are exemplary diagrams illustrating a system according to the present disclosure.
Figure 3B:
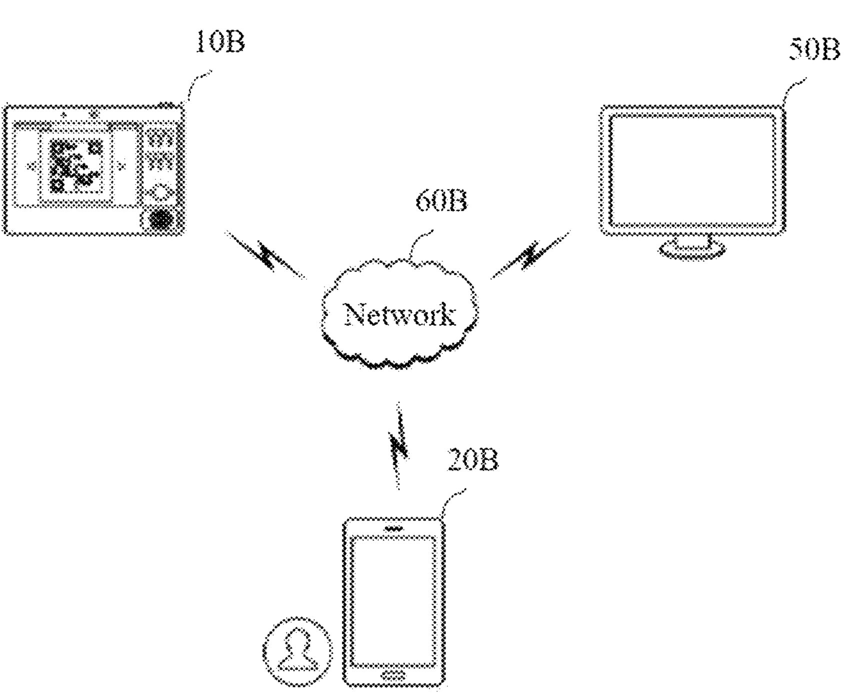
Figure 4:
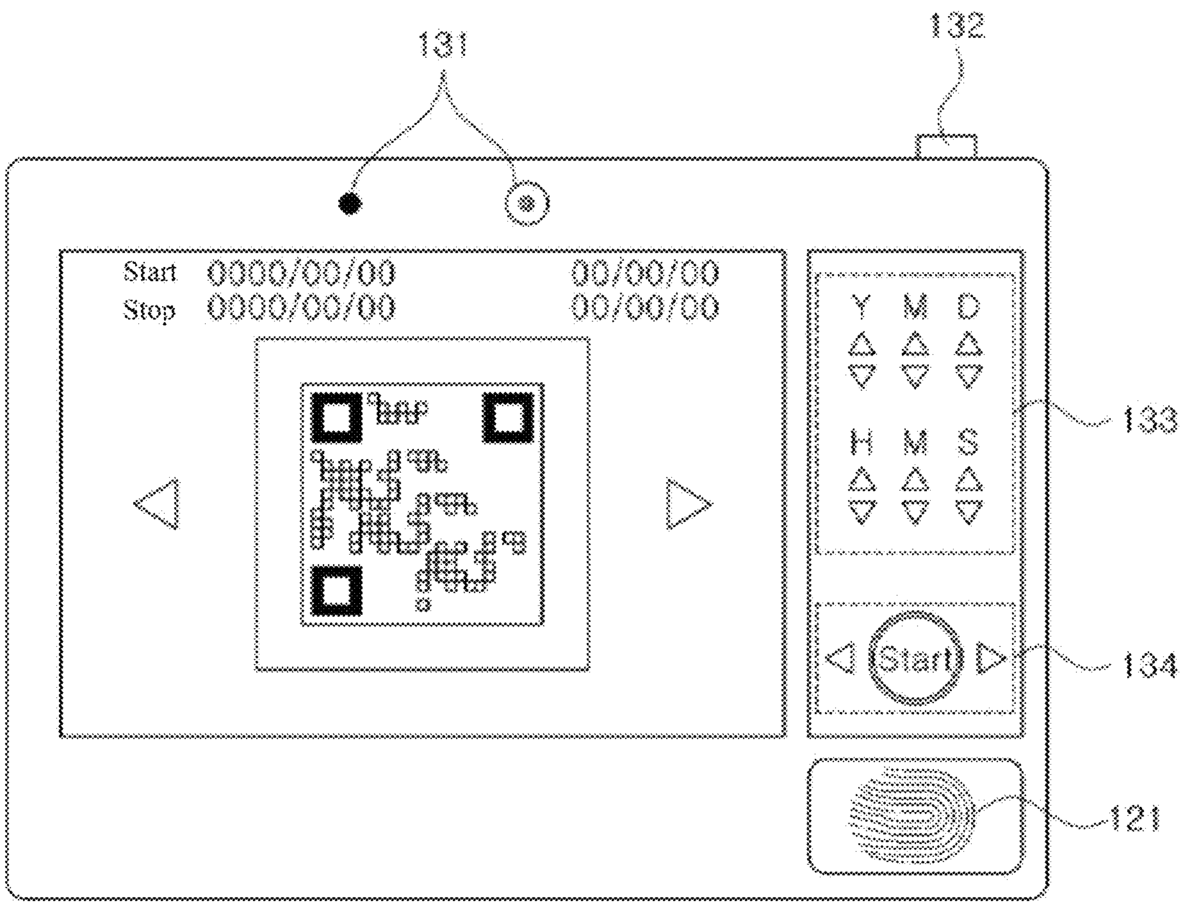
FIGS. 4 and 5 are exemplary diagrams illustrating a tracker according to the present disclosure.
Figure 5:
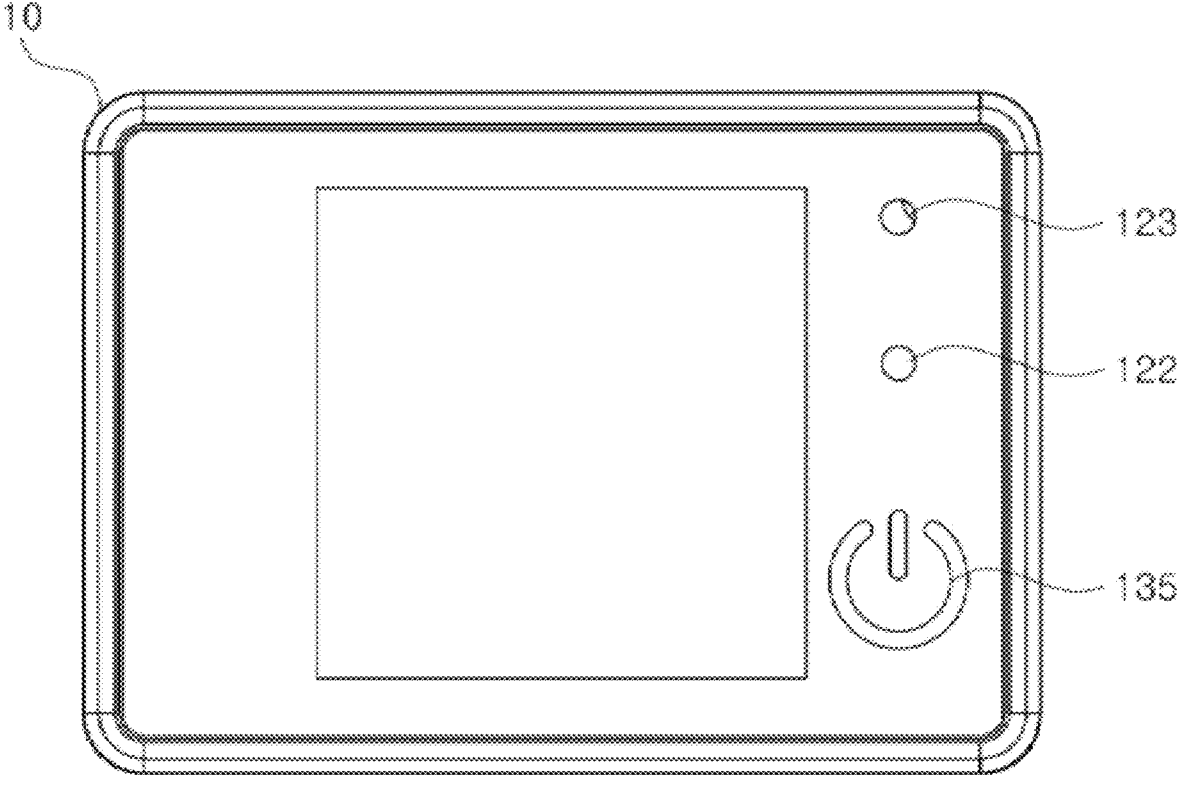

FIGS. 3*a* and 3*b* illustrate a system according to this disclosure. FIGS. 4 and 5 illustrate a tracker according to this disclosure. FIG. 4 shows the front view of the tracker, while FIG. 5 shows the rear view.

Referring to FIG. 3*a*, to perform the operation of this disclosure, a tracker 10A for the cargo transport space, a user terminal 20A, a temperature and humidity sensor 30A, and a distance measurement sensor 40A may be provided.

The tracker 10A includes various devices that can perform computational processing and provide results to users.

The user terminal 20A may include both computers and portable user terminals. The computer, for example, may include laptops, desktops, notebooks, tablet PCs, and slate PCs equipped with a web browser.

The device (server) performs communication with external devices and processes information. It may include an application server, computing server, database server, file server, game server, mail server, proxy server, and web server.

The portable user terminal may include handheld wireless communication devices such as PCS, GSM, PDC, PHS, PDA, IMT-2000, CDMA-2000, W-CDMA, WiBro, smartphones, and wearable devices such as smartwatches, rings, bracelets, anklets, necklaces, glasses, contact lenses, and head-mounted devices (HMDs).

The temperature and humidity sensor 30A may be attached inside the cargo transport space. It may be prepositioned by the user and sense the temperature and humidity inside the cargo, outputting the sensing information to the tracker 10A. In one embodiment, the temperature and humidity sensor 30A may include a temperature measurement sensor and a humidity measurement sensor. The temperature unit may be in degrees Celsius (° C.), and the humidity unit may be in percentage (%), but is not limited thereto.

The distance measurement sensor 40A may be attached inside the cargo transport space and measure distances between predetermined first positions and second positions, generating distance data. The distance measurement sensor 40A may include a Lidar sensor, ultrasound sensor, short-/medium-range radar sensor, long-range radar sensor, or cameras.

Referring to FIG. 3*b*, the system 100B may include a tracker 10B, a first user terminal 20B, a second user terminal 50B, and a communication network 60B. The number of user terminals in FIG. 3 is two, but it may be one or more than three.

The tracker 10B may be a device for sensing and correcting the maritime transport environment of a ship. The tracker 10B may communicate with the first and second user terminals 20B, 50B via the communication network 60B. The tracker 10B includes various devices that can perform computational processing and provide results to users. For example, it may include computers, server devices, and portable terminals, or may be in the form of one or the other. Here, the computer may include, for example, a notebook, desktop, laptop, tablet PC, slate PC, etc. equipped with a WEB Browser. The device (server) is a server that processes information by communicating with an external device, and may include an application server, a computing server, a database server, a file server, a game server, a mail server, a proxy server, and a web server.

Referring to FIG. 4, the front of the tracker 10B may be equipped with a sensing unit 131, a switch 132, input units 133, 134, a fingerprint recognition button 121, and a display. A user may enter the start and end dates through the input unit 133 on the display.

Referring to FIG. 5, the rear side of the tracker 10B may include various buttons 122, 123 and a power indicator 135. The input unit is designed to receive user input, allowing information to be entered via the user input unit. This user input unit may include hardware-based physical keys (e.g., buttons, dome switches, jog wheels, jog switches, etc.), which may be positioned on at least one of the front, rear, or side of the device, as well as software-based touch keys. For example, touch keys may be virtual keys, soft keys, or visual keys displayed on a touchscreen-based display through software processing, or touch keys positioned outside of the touchscreen area. Virtual or visual keys may be displayed in various forms on the touchscreen, including graphics, text, icons, videos, or a combination thereof.

Referring to FIG. 3B, the first user terminal 20B and the second user terminal 50B may include both the aforementioned computer and portable user terminal or be implemented in one of these forms. A portable user terminal may be any wireless communication device ensuring portability and mobility, including but not limited to Personal Communication Systems (PCS), Global System for Mobile Communications (GSM), Personal Digital Cellular (PDC), Personal Handyphone Systems (PHS), Personal Digital Assistants (PDA), International Mobile Telecommunication-2000 (IMT-2000), Code Division Multiple Access-2000 (CDMA-2000), Wideband Code Division Multiple Access (W-CDMA), Wireless Broadband Internet (WiBro) terminals, smartphones, as well as various handheld-based wireless communication devices. Additionally, it may include wearable devices such as watches, rings, bracelets, anklets, necklaces, glasses, contact lenses, or head-mounted devices (HMDs).

Figure 6:
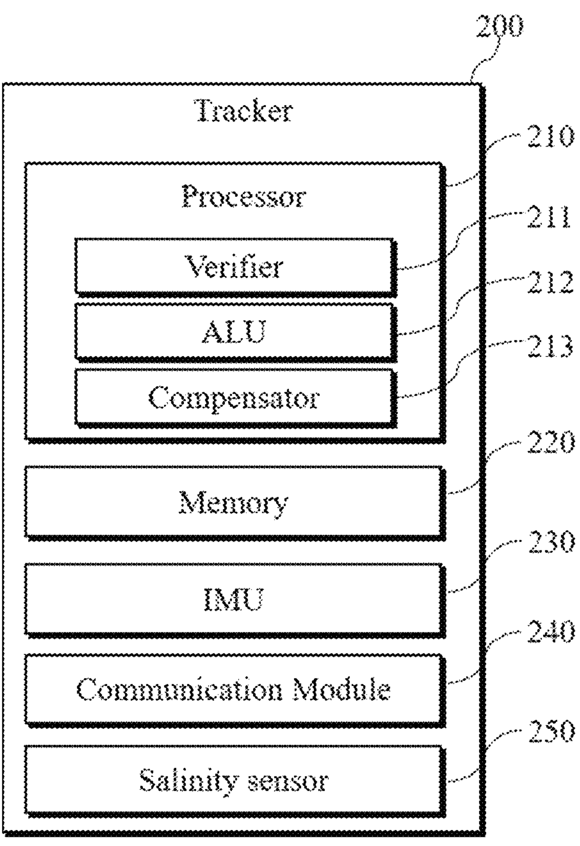
FIG. 6 is a block diagram illustrating the tracker according to the present disclosure.

FIG. 6 illustrates a block diagram exemplifying the tracker of the present disclosure.

Referring to FIG. 6, the tracker 200 is capable of sensing unique physical quantities within the marine transport environment using a One-Time QR-code (OTQ) and correcting conditions that cause abnormal values.

During maritime transport, significant rolling may occur due to the pitch and yaw induced by fluid movement, particularly depending on the ship's navigation route and the weight distribution of the cargo loaded on the ship 1. Accordingly, the tracker 200 corrects the most frequent noise in the roll direction, thereby eliminating its impact and filtering out environmental noise in the roll values, allowing it to sense only the actual impact applied to the cargo. Consequently, this enables more accurate estimation of the transport environment.

The tracker 200 may include a processor 210, memory 220, an inertial sensor 230, a communication module 240, and a salinity sensor 260.

The processor 210 can receive sensing information on the temperature and humidity inside the cargo loaded on the ship from an external source. The sensing information may be generated by the temperature and humidity measurement sensor 30A in FIG. 3A. The processor 210 can verify temperature and humidity based on at least one of the GPS location of the ship 1 and the Estimated Time of Arrival (ETA) at the destination along the ship's route. The processor 210 can then correct the transport environment information, including temperature and humidity, based on the verification results.

In one embodiment, the processor 210 may include a verification unit 211, a calculation unit 212, and a correction unit 213.

The verification unit 211 performs spatial and temporal verification. In spatial verification, the verification unit 211 measures the current location of the ship 1 using GPS and compares the predicted temperature and humidity at that location with a predefined first reference value. Based on this comparison, the verification unit 211 verifies the current temperature and humidity of the ship 1. In temporal verification, the verification unit 211 measures the ETA along the ship's travel route and compares the predicted temperature and humidity at the ETA with a predefined second reference value. Based on this comparison, it verifies the current temperature and humidity of the ship 1. In one embodiment, the verification unit 211 first performs spatial verification and then conducts temporal verification as a secondary step.

The calculation unit 212 performs necessary computations within the processor 210. In one embodiment, the calculation unit 212 may be implemented as an Arithmetic and Logic Unit (ALU) that receives input operands, opcodes, and state information, performs computations, and outputs the results. In another embodiment, the calculation unit 212 calculates and outputs correction parameters based on the measured temperature and humidity in comparison to reference values.

The correction unit 213 corrects the transport environment based on the verification results from the verification unit 211 and the correction parameters computed by the calculation unit 212. The transport environment may include temperature and humidity.

The memory 220 stores data supporting various functions of the tracker 200 and programs for operating the processor 210. It can store input/output data such as music files, still images, videos, multiple application programs running on the tracker 200, and data/commands for tracker operation. Some of these applications may be downloaded from external servers via wireless communication. The memory 220 may include storage media such as flash memory, hard disk, SSD, SDD, multimedia card micro type, card-type memory (e.g., SD or XD memory), RAM, SRAM, ROM, EEPROM, PROM, magnetic memory, magnetic disk, and optical disk. Additionally, the memory 220 may store lookup tables (LUTs) containing error data measured for different navigation routes of the ship 1, location-based LUTs for ship-positioned regions, and cargo-specific LUTs.

The inertial sensor 230 senses physical quantities derived from wave friction and the ship's engine. It can measure the roll, vibrations, and/or impacts applied to the ship 1. It operates based on 6 Degrees of Freedom (6DoF) or 9 Degrees of Freedom (9DoF) to detect ship movements. This is designed to ensure applicability to the V2+ inertial sensor. In one embodiment, the inertial sensor 230 may be implemented as an Inertial Measurement Unit (IMU).

The communication module 240 facilitates communication interfaces, allowing connectivity with external devices. It may include at least one component for wired or wireless communication. Wired communication modules may include LAN, WAN, Value Added Network (VAN), USB, HDMI, DVI, RS-232, power line communication, and POTS. Wireless communication modules may support various standards such as Wi-Fi, WiBro, GSM, CDMA, WCDMA, UMTS, TDMA, LTE, 4G, 5G, 6G, and others. The wireless communication module may include an antenna and transmitter for signal transmission and may further include a signal conversion module that modulates digital control signals from the processor 210 into analog wireless signals. The short-range communication module supports technologies such as Bluetooth™, RFID, Infrared Data Association (IrDA), Ultra-Wideband (UWB), ZigBee, NFC, Wi-Fi Direct, and Wireless USB for short-range communication.

The salinity sensor 260 tracks corrosion and other environmental effects affecting precision machinery such as ships 1. It measures or senses salinity levels around the ship 1. In one embodiment, the calculation unit 212 may receive and process salinity data from the salinity sensor 260 to compute correction parameters. The correction unit 213 then corrects the transport environment based on verification results from the verification unit 211 and the correction parameters computed by the calculation unit 212.

Figure 7:
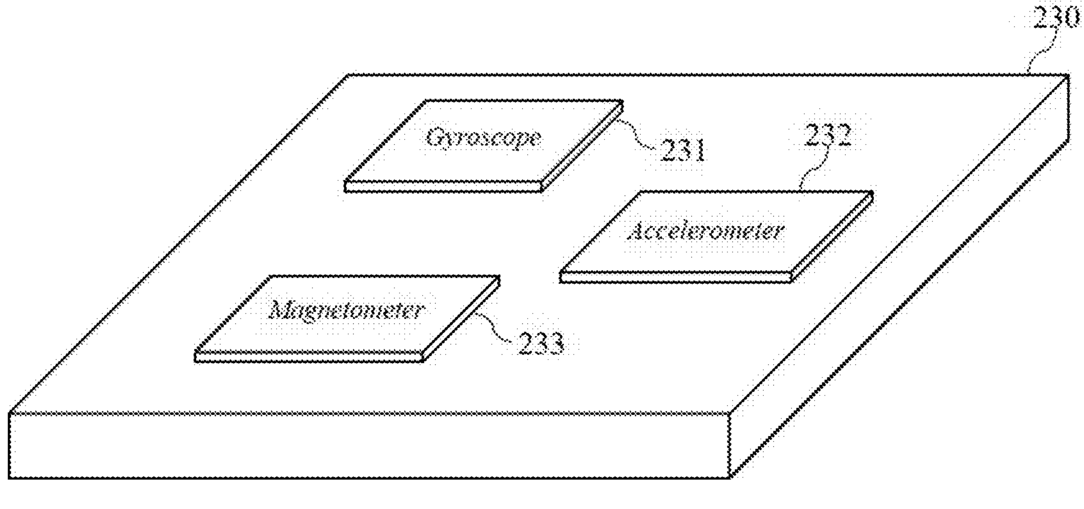
FIG. 7 is an exemplary diagram illustrating an inertial sensor according to the present disclosure.

FIG. 7 is an exemplary diagram illustrating the inertial sensor of the present disclosure.

Referring to FIGS. 6 and 7, the inertial sensor 230 may be implemented as an Inertial Measurement Unit (IMU). The IMU-based inertial sensor 230 may include an angular velocity sensor 231, an acceleration sensor 232, and a geomagnetic sensor 233.

The angular velocity sensor 231, also referred to as a gyroscope, can measure the angular velocity of the ship 1 to determine how many degrees per hour the ship 1 has rotated. The acceleration sensor 232, also referred to as an accelerometer, can measure angular velocity by decomposing gravitational acceleration to determine the tilt of the ship 1 when calculating initial values. The geomagnetic sensor 233, also referred to as a magnetometer, measures the magnetic flux intensity relative to the magnetic north to determine how much the ship 1 has deviated from magnetic north.

Figure 8:
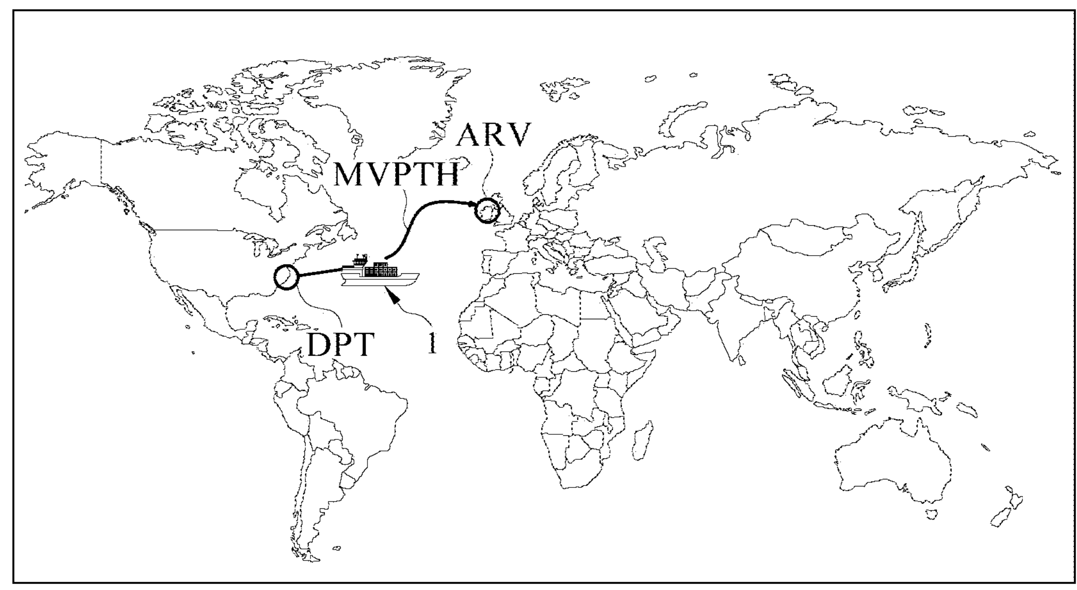
FIG. 8 is an exemplary diagram illustrating an embodiment of verifying and correcting ship information while the ship is in motion.

FIG. 8 is an exemplary diagram illustrating an embodiment of verifying and correcting ship information as the ship moves.

Referring to FIG. 8, the departure point (DPT) of the ship 1 is New York, and the arrival point (ARV) is London. The navigation route (MVPTH) between New York and London is assumed to be as shown in FIG. 8.

The verification unit 211 can first estimate the expected temperature and humidity along the navigation route (MVPTH) and preliminarily calculate the ETA along the route. For example, as the ship 1 moves along the navigation route (MVPTH), it may pass through the Atlantic Ocean, causing changes in latitude. As the ship 1 transitions from the shore to the deep sea, the humidity of the cargo inside the ship 1 may increase. Conversely, as the ship 1 moves away from the deep sea, the humidity of the cargo may decrease. The calculation unit 212 can compute correction parameters considering such conditions. The correction unit 213 updates the time zone and humidity variations. Meanwhile, if the ship 1 does not cross the equator but moves eastward (increasing longitude), the average temperature of the cargo inside the ship 1 may decrease. The calculation unit 212 can compute correction parameters considering these conditions, and the correction unit 213 updates temperature variations based on longitude.

The verification unit 211 can verify temperature and humidity by comparing them with estimated values based on the actual trajectory log. If errors occur in the temperature and humidity log, the error data may be stored and updated in the memory 220. The updated data allows correction of estimated temperature and humidity values and can be used for model refinement. This provides the advantage of precisely analyzing error causes such as human errors and device measurement errors.

Additionally, temporal errors may occur due to route changes, abnormal weather conditions, or evasive maneuvers taken by the ship 1. The calculation unit 212 can compute correction parameters considering these factors, and the correction unit 213 can update the temperature variations by longitude. This allows updating navigation information based on error cause analysis and fine-tuning the verification logic.

Figure 9:
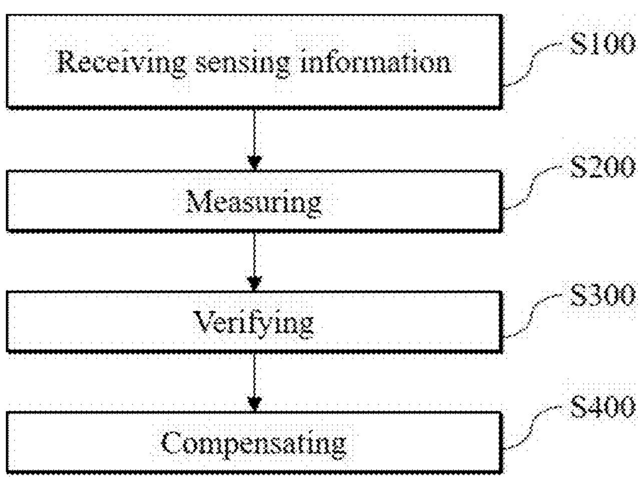
FIG. 9 is a flowchart illustrating a method according to the present disclosure.

FIG. 9 is a flowchart illustrating the method according to the present disclosure.

Referring to FIG. 9, the method for sensing and correcting the marine transport environment of a ship according to the present disclosure includes sensing information reception step S100, measurement step S200, verification step S300 and correction step S400.

Sensing information reception step S100: Receiving sensing information on the temperature and humidity inside the cargo contained in the ship from an external source. This step is performed by the processor 210.

Measurement step S200: Measuring the roll of the ship. This step is performed by the inertial sensor 230.

Verification step S300: Verifying temperature and humidity based on at least one of the GPS location of the ship and the estimated time of arrival (ETA) of the ship along its travel route. This step is performed by the verification unit 211 of the processor 210.

Correction step S400: Correcting transport environment information, including temperature and humidity, based on the verification results. This step is performed by the correction unit 213 of the processor 210.

Additionally, the disclosed embodiments may be implemented as a computer-readable recording medium storing computer-executable instructions. The instructions may be stored in the form of program code, which, when executed by the processor, generates program modules that perform the operations of the disclosed embodiments.

The recording medium may be implemented as a computer-readable storage medium, which includes all types of storage media capable of storing instructions readable by a computer. Examples of such storage media include ROM (Read-Only Memory), RAM (Random Access Memory), magnetic tapes, magnetic disks, flash memory, and optical data storage devices.

As described above, the disclosed embodiments have been explained with reference to the attached drawings. Those skilled in the art will understand that the present disclosure can be implemented in forms other than those explicitly described, without altering its technical spirit or essential characteristics. The disclosed embodiments are merely exemplary and should not be construed as limiting.

2. Embodiment 2

The following describes another embodiment. This embodiment illustrates a system and method for detecting abnormal conditions of a battery in a ship's marine transport environment. In this disclosure, even if the reference numerals of Embodiment 2 correspond to those in Embodiment 1, they should be understood as referring to different configurations.

In this specification, the term "device according to the present disclosure" includes various devices capable of performing computational processing and providing results to users. For example, the device according to the present disclosure may include a computer, a server device, and a portable terminal, or it may be implemented in one of these forms.

Here, a computer may include, for example, a notebook, desktop, laptop, tablet PC, or slate PC equipped with a web browser.

A server device refers to a server that processes information through communication with external devices, and may include an application server, computing server, database server, file server, game server, mail server, proxy server, or web server.

A portable terminal may be any wireless communication device ensuring portability and mobility, including but not limited to Personal Communication System (PCS), Global System for Mobile Communications (GSM), Personal Digital Cellular (PDC), Personal Handyphone System Personal (PHS), Digital Assistant (PDA), International Mobile Telecommunication-2000 (IMT-2000), Code Division Multiple Access-2000 (CDMA-2000), Wideband Code Division Multiple Access (W-CDMA), Wireless Broadband Internet (WiBro) terminals, smartphones, as well as various handheld-based wireless communication devices. Additionally, it may include wearable devices such as watches, rings, bracelets, anklets, necklaces, glasses, contact lenses, or head-mounted devices (HMDs).

The artificial intelligence (AI)-related functions in the present disclosure operate through a processor and memory. The processor may be composed of one or multiple processors. These processors may include general-purpose processors such as CPU, AP (Application Processor), DSP (Digital Signal Processor), as well as specialized processors such as GPU, VPU (Vision Processing Unit), or NPU (Neural Processing Unit) dedicated to artificial intelligence. The processors control the processing of input data based on predefined operational rules or AI models stored in memory. If one or more processors are AI-specific, the AI-specific processor may be designed with a specialized hardware structure optimized for processing a specific AI model. For example, the processor may include an MCU (Microcontroller Unit), fan control actuators, and an APU (Accelerated Processing Unit).

The predefined operational rules or AI models are characterized by being generated through learning. This means that the fundamental AI model undergoes training using multiple training datasets through a learning algorithm, resulting in a predefined operational rule or AI model configured to perform the intended function. This training may occur within the device itself that executes AI, or it may be performed via an external server and/or system. Examples of learning algorithms include supervised learning, unsupervised learning, semi-supervised learning, and reinforcement learning, but are not limited to these.

The AI model may be composed of multiple neural network layers. Each of these layers contains multiple weight values, which are used to perform neural network computations based on operations between these weights and the output of the previous layer. The weights of the neural network layers can be optimized through training. For example, during training, the weight values are updated to minimize or reduce loss values or cost values obtained from the AI model. The artificial neural network may include a Deep Neural Network (DNN) such as a Convolutional Neural Network (CNN), Recurrent Neural Network (RNN), Restricted Boltzmann Machine (RBM), Deep Belief Network (DBN), Bidirectional Recurrent Deep Neural Network (BRDNN), or Deep Q-Networks (DON), among others.

According to an exemplary embodiment of the present disclosure, the processor can implement artificial intelligence (AI). Artificial intelligence refers to machine learning based on artificial neural networks (ANN), which mimic biological neurons to enable machines to learn. AI methodologies can be categorized based on learning approaches as follows: Supervised Learning-training data includes both input and output data, where the answer (output data) is predefined, Unsupervised Learning—only input data is provided without predefined output data, and Reinforcement Learning—the model learns by maximizing rewards received from an external environment based on its actions in a given state. AI methodologies can also be categorized by learning model architectures. Popular deep learning architectures include CNN (Convolutional Neural Network), RNN (Recurrent Neural Network), Transformer, and Generative Adversarial Networks (GANs), among others.

The device and system in this disclosure may include an AI model. The AI model may be a single model or multiple AI models. A neural network (or artificial neural network) may be configured with statistical learning algorithms that mimic biological neurons in machine learning and cognitive science. The neural network consists of artificial neurons (nodes) that adjust synaptic strength through learning, allowing the model to develop problem-solving capabilities. The neurons in the neural network include weights or biases, and the neural network comprises one or more layers, such as input layers, hidden layers, and output layers. The neural network that makes up the device can infer the desired result (output) from any input by changing the weights of the neurons through learning.

The processor may create a neural network, train or learn the neural network, perform computations based on received input data, generate an information signal based on the results of the computations, or retrain the neural network. Neural network models include, but are not limited to, CNN (Convolutional Neural Network), R-CNN (Region-based CNN), RPN (Region Proposal Network), RNN (Recurrent Neural Network), Stacking-based Deep Neural Network (S-DNN), State-Space Dynamic Neural Network (S-SDNN), Deep Belief Network (DBN), Restricted Boltzmann Machine (RBM), Fully Convolutional Network (FCN), Long Short-Term Memory (LSTM) Network, Classification Network, such as GoogleNet, AlexNet, VGG Network. The processor may include one or more processors for performing operations according to models of the neural network. For example, the neural network may include a deep neural network.

The neural network may include, but are not limited to, CNN, RNN, perceptron, multilayer perceptron, FF (Feed Forward), RBF (Radial Basis Network), DFF (Deep Feed Forward), LSTM (Long Short Term Memory), GRU (Gated Recurrent Unit), AE (Auto Encoder), VAE (Variational Auto Encoder), DAE (Denoising Auto Encoder), SAE (Sparse Auto Encoder), MC (Markov Chain), HN (Hopfield Network), BM (Boltzmann Machine), RBM (Restricted Boltzmann Machine), DBN (Depp Belief Network), DCN (Deep Convolutional Network), DN (Deconvolutional Network), DCIGN (Deep Convolutional Inverse Graphics Network), GAN (Generative Adversarial Network), LSM (Liquid State Machine), ELM (Extreme Learning Machine), ESN (Echo State Network), DRN (Deep Residual Network), DNC (Differentiable Neural Computer), NTM (Neural Turning Machine), CN (Capsule Network), KN (Kohonen Network) and AN (Attention Network). It will be appreciated by those skilled in the art that this may include any neural network, but is not limited thereto.

According to an exemplary embodiment of this disclosure, the processor can utilize various AI structures and algorithms, including but not limited to CNN (Convolutional Neural Network), R-CNN, RPN, RNN, S-DNN, S-SDNN, Deconvolution Network, DBN, RBM, Fully Convolutional Network, LSTM, Classification Network, Generative Modeling, explainable AI, Continual AI, Representation Learning, AI for Material Design, Natural language processing models: BERT, SP-BERT, MRC/QA, Text Analysis, Dialog System, GPT-3, GPT-4, Vision processing models: Visual Analytics, Visual Understanding, Video Synthesis, ResNet, Data intelligence models: Anomaly Detection, Prediction, Time-Series Forecasting, Optimization, Recommendation, Data Creation, among others.

The detailed description of this disclosure will now be explained with reference to the attached drawings.

Figure 10:
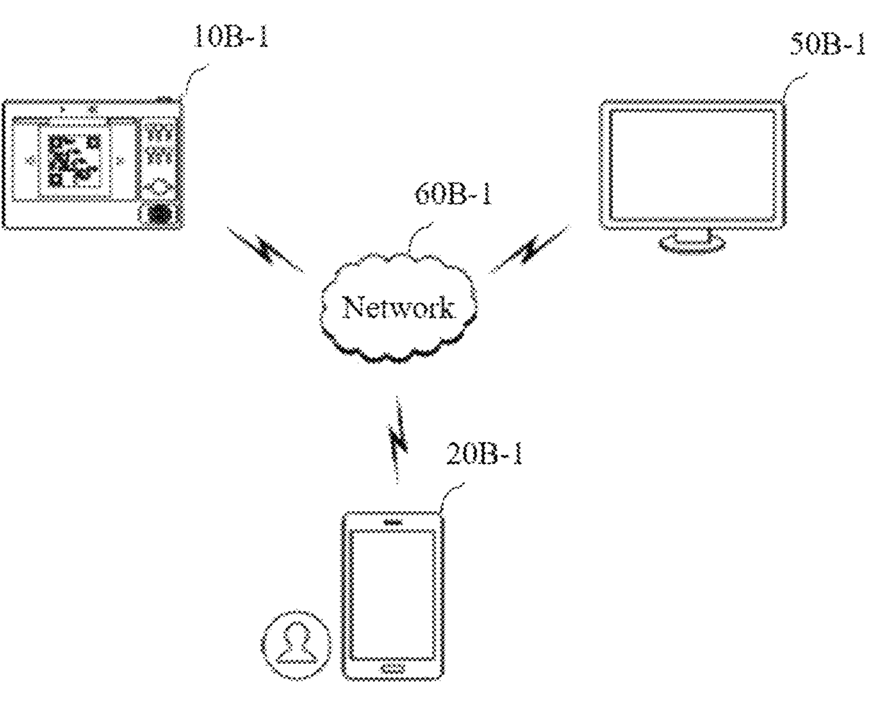
FIG. 10 is an exemplary diagram illustrating a system according to one embodiment of the present disclosure.
Figure 11:
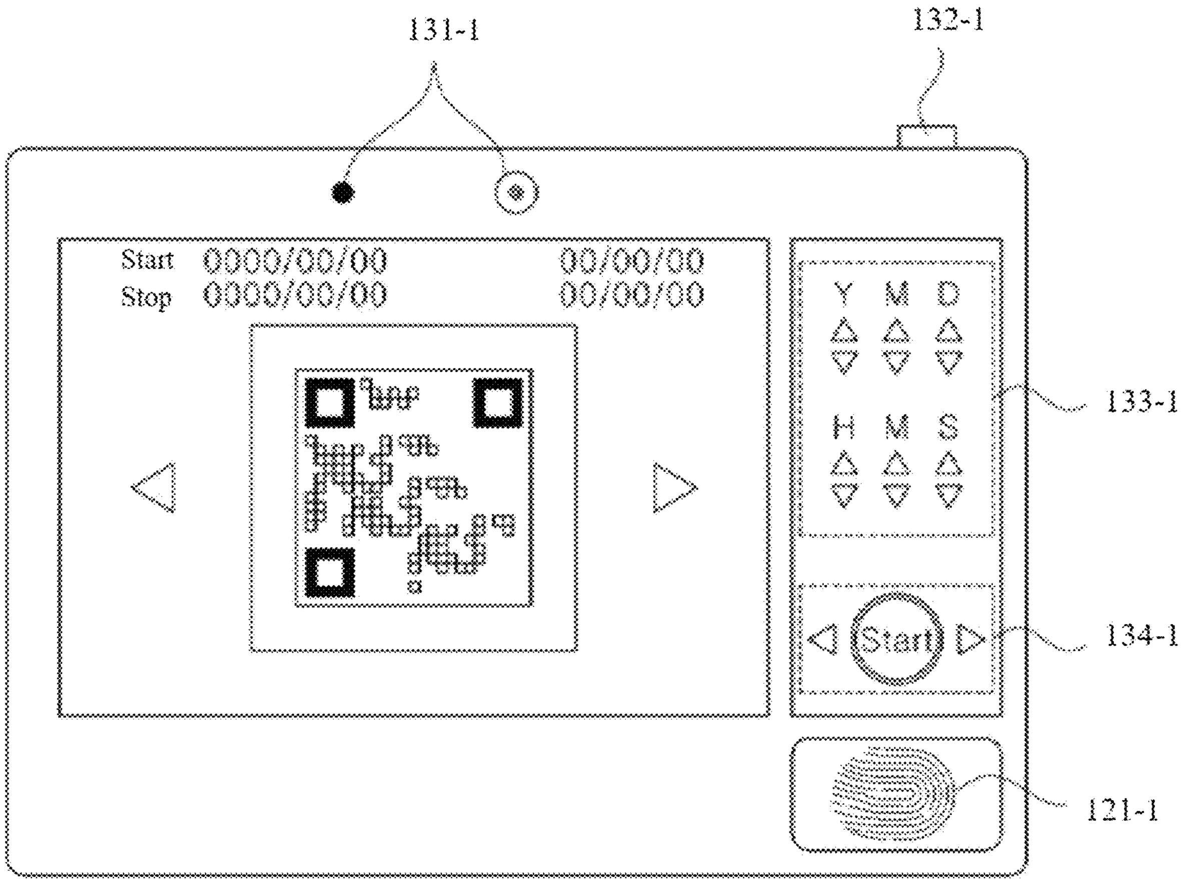
FIGS. 11 and 12 are exemplary diagrams illustrating a tracker according to the present disclosure.
Figure 12:
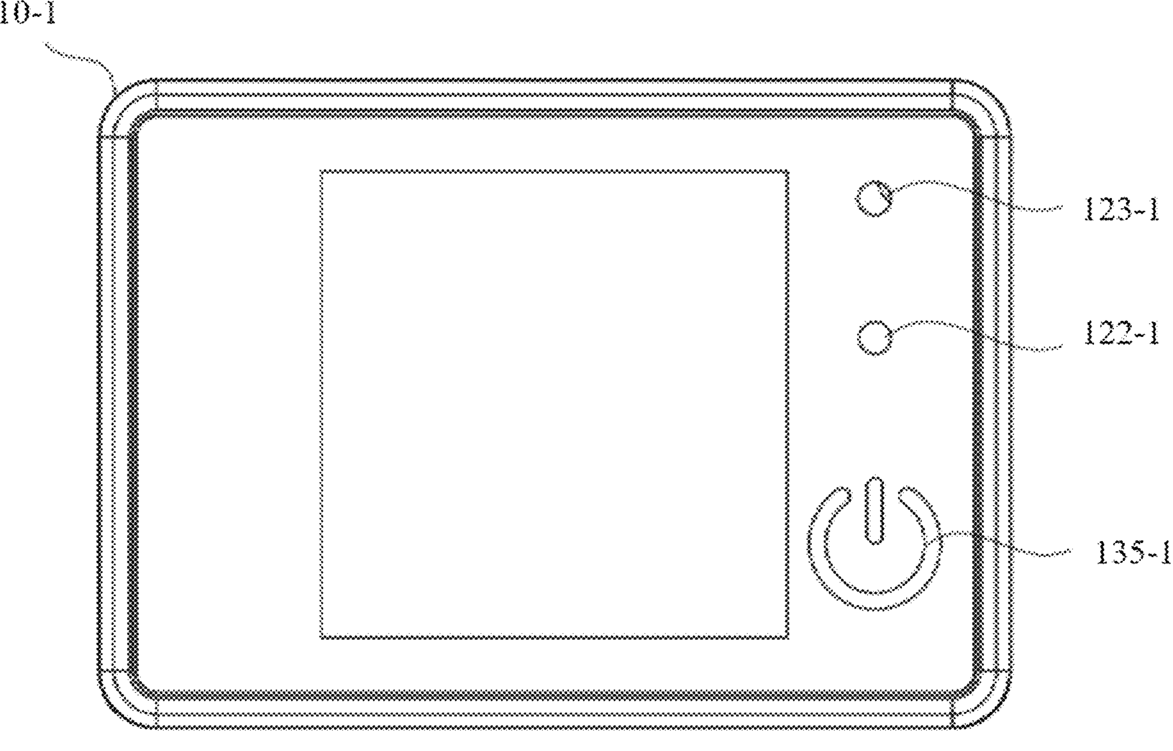

FIG. 10 illustrates a system according to one embodiment of this disclosure. FIGS. 11 and 12 illustrate an exemplary tracker of the present disclosure, where FIG. 11 is a front view, and FIG. 12 is a rear view of the tracker.

A ship may travel from a departure point to a destination along a predetermined navigation route. For example, the ship may move in a first direction and/or a second direction and may also shift in a third direction due to waves. While moving, the ship is influenced by waves, wind, gravity, and geomagnetic forces, which cause pitching, yawing, and rolling motions.

The ship carries at least one cargo, which may include transport information and a device for estimating ship transport conditions, referred to as a tracker. As the ship transports various types of cargo, the center of gravity may shift, and the ship and cargo may rock on the sea due to their weight. Cargo may be included in the transport space of a ship, while the transport space may refer to a space where cargo is transported, such as a transport space of a container box, a reefer container, and a liner. While the ship is operating, the battery contained inside the tracker, which is included in the ship or the cargo loaded on the ship and tracks and transmits the ship's transport information, may be damaged. Gas may leak due to the damage of the battery while the ship is transported along the sea.

FIG. 10 illustrates a system 100-1 for detecting abnormal battery conditions in a ship's marine transport environment. This system 100-1 includes a tracker 10-1, a first user terminal 20-1, a second user terminal. 30-1, and a communication network 40-1. In FIG. 12, the number of user terminals is two, but is not limited thereto, and may be one or three or more.

The tracker 10-1 can communicate with the first and second user terminals 20-1, 30-1 via the communication network 40-1. The tracker 10-1 includes various devices that can perform computational processing and provide results to the user. For example, the tracker 10-1 may include a computer, a device (server), and a portable terminal, or may be in the form of any one of them. Here, the computer may include, for example, a notebook, a desktop, a laptop, a tablet PC, a slate PC, etc. equipped with a web browser. The device (server) is a server that communicates with an external device to process information, and may include an application server, a computing server, a database server, a file server, a game server, a mail server, a proxy server, and a web server.

Referring to FIG. 11, the front of the tracker 10-1 may include a sensing unit 131-1, switch 132-1, input units 133-1, 134-1, fingerprint recognition button (121-1), and a display. The user may, input the start and end dates on the display through the input unit 133-1.

Referring to FIG. 12, the rear of the tracker 10-1 may include various buttons 122-1, 123-1 and a power indicator 135-1. The input unit is designed to receive user inputs, allowing data to be entered through the user input interface. The user input unit may include hardware-based physical keys (e.g., buttons located on the front, rear, or side of the device, dome switches, jog wheels, jog switches, etc.) and software-based touch keys. For example, touch keys may be displayed as virtual keys, soft keys, or visual keys on a touchscreen display through software processing. Alternatively, touch keys may be placed outside the touchscreen. Virtual or visual keys may be displayed in various forms, such as graphics, text, icons, videos, or a combination thereof on the touchscreen.

Referring to FIG. 12, the first user terminal 20-1 and second user terminal 30-1 may include both the aforementioned computer and portable user terminals, or they may be implemented in a single form. For example, a portable user terminal may be any wireless communication device ensuring portability and mobility, including but not limited to Personal Communication System (PCS), Global System for Mobile Communications (GSM), Personal Digital Cellular (PDC), Personal Handyphone System Personal Digital (PHS), Assistant (PDA), International Mobile Telecommunication-2000 (IMT-2000), Code Division Multiple Access-2000 (CDMA-2000), Wideband Code Division Multiple Access (W-CDMA), Wireless Broadband Internet (WiBro) terminals, smartphones, as well as wearable devices such as watches, rings, bracelets, anklets, necklaces, glasses, contact lenses, or head-mounted devices (HMDs).

As described above, by introducing a virtual sensor to replace an actual gas sensor, the system reduces manufacturing costs and improves gas sensing accuracy.

Figure 13A:
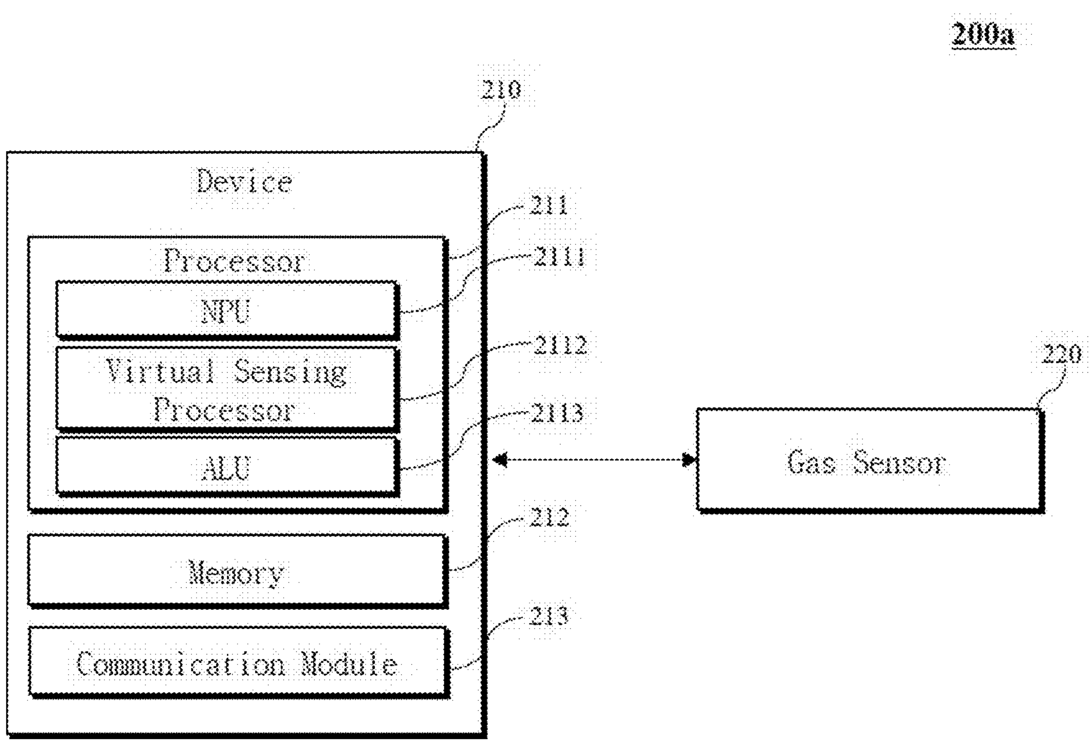
FIGS. 13A and 13B are exemplary diagrams illustrating a system according to another embodiment of the present disclosure.
Figure 13B:
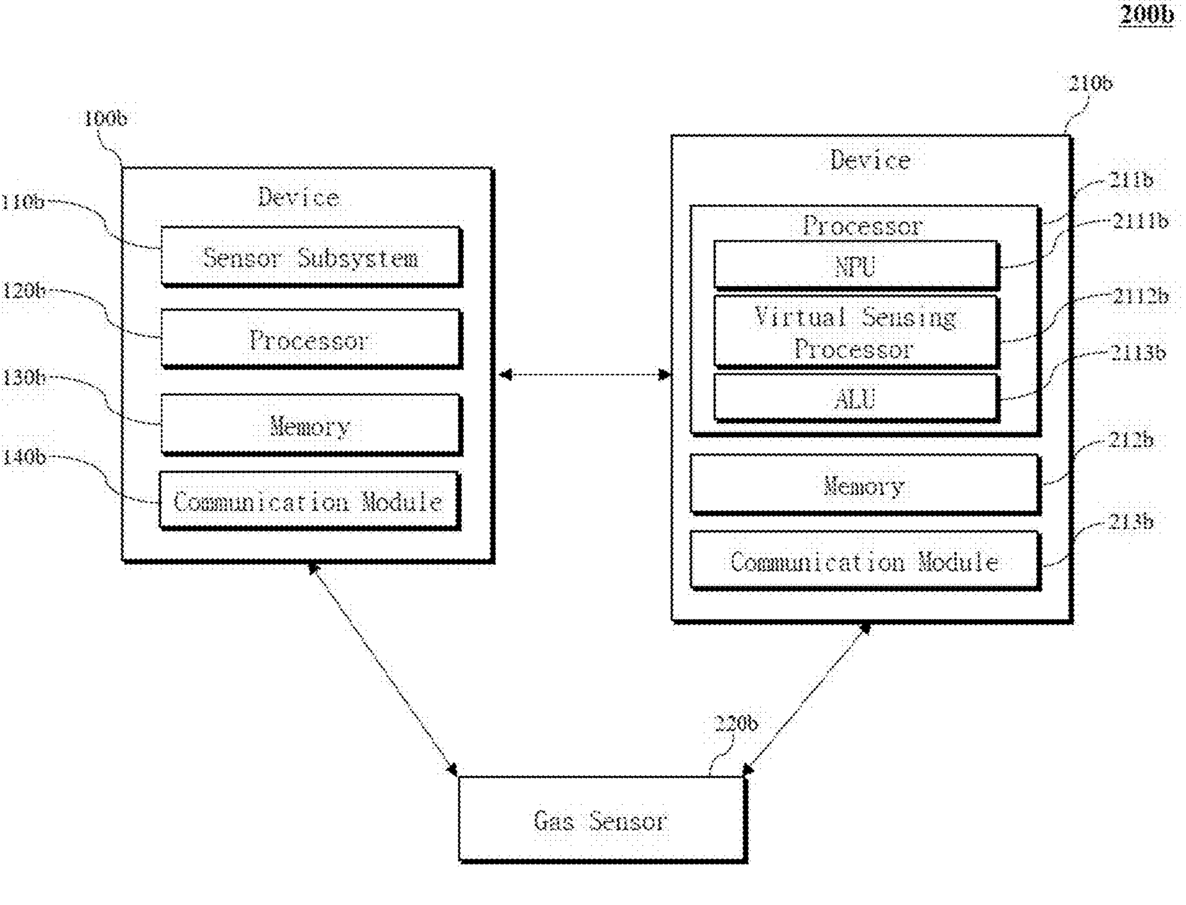

FIGS. 13A and 13B illustrate another embodiment of the system according to the present disclosure.

Referring to FIG. 13A, the system **200*a*-1 may be designed to detect abnormal conditions of a battery contained within a ship in a marine transport environment. The system 200*a*-1 may include a device 210-1 and a gas sensor 220-1**.

The device 210-1 may include a processor 211-1, memory 212-1, and communication module 213-1.

The processor 210-1 can detect abnormal battery conditions within the marine transport environment of a ship. In one embodiment, the processor 210-1 may include Neural Network Processing Unit 2111-1, Virtual Sensing Processing Unit 2112-1, Computation Unit 2113-1. In this disclosure, the Neural Network Processing Unit 2111-1 may be physically configured on a printed circuit board of the device 210-1 or may function as a logical module within the processor chipset. For example, the Neural Network Processing Unit 2111-1 may be stored as program code in the memory 212-1, which is fetched and sequentially interpreted by the processor 211-1 to implement a trained machine learning model for achieving a specific purpose.

The Neural Network Processing Unit 2111-1 is responsible for creating and training an AI model. This AI model can learn temperature and humidity variation patterns within an enclosed space based on sensing data generated by a sensing device. Sensing data may be obtained from a device attached to the cargo and may include temperature and humidity information. For example, sensing data may be expressed as a 2D electronic code, 3D electronic code, barcode, QR code, hologram code, or any other format. Additionally, sensing data may be presented as a One-Time QR code (OTQ), which updates periodically.

The Virtual Sensing Processing Unit 2112-1 receives sensing data from external sources and, using both the AI model and the received ship sensing data, detects gas leaks based on changes in temperature and humidity within the enclosed space. In this disclosure, the Virtual Sensing Processing Unit 2112-1 functions as a virtual sensor that operates as if it were sensing gas based on a pre-trained machine learning model implemented by the Neural Network Processing Unit 2111-1.

In one embodiment, the Virtual Sensing Processing Unit 2112-1 may structure gas chemical formulas as text-based structured data. In one embodiment, the Virtual Sensing Processing Unit 2112-1 may convert structured data into spectral data of gas recomposition. In one embodiment, the Virtual Sensing Processing Unit 2112-1 may estimate the probability of gas exceeding a threshold concentration under specific temperature and humidity conditions. In one embodiment, the Virtual Sensing Processing Unit 2112-1 may apply Bayesian estimation algorithms to refine the gas behavior probability based on actual temperature and humidity measurements. In one embodiment, the Virtual Sensing Processing Unit 2112-1 may estimate gas behavior for different temperature and humidity conditions based on the posterior probability. In one embodiment, the Virtual Sensing Processing Unit 2112-1 may obtain trends of temperature and humidity changes when a threshold level of gas is present under standard conditions.

The Computation Unit 2113-1 performs various computations within the processor 211-1. In one embodiment, the Computation Unit 2113-1 may be implemented as an Arithmetic and Logical Unit (ALU), but it is not limited to this configuration.

The memory 212-1 can store data supporting various functions of the tracker 200-1 and a program for the operation of the processor 210-1, can store input/output data (e.g., music files, still images, moving images, etc.), and can store a plurality of application programs (or applications) run on the tracker 200-1, data for the operation of the tracker 200-1, and commands. At least some of these applications may be downloaded from external servers via wireless communication.

The Memory 212-1 may be implemented using flash memory, hard disk, SSD, SDD, multimedia card micro type, SD memory, XD memory, RAM, SRAM, ROM, EEPROM, PROM, magnetic memory, magnetic disk, optical disk, or any other type of storage medium. The Memory 212-1 can store lookup Tables (LUTs) containing error data measured for different ship routes and cargo-specific LUTs.

The Communication Module 213-1 enables wired or wireless communication. A communication interface may include one or more components that enable communication with external devices. For example, the communication interface may include at least one of a wired communication module, a wireless communication module, and a short-range communication module. The wired communication module may include various wired communication modules such as a Local Area Network (LAN) module, a Wide Area Network (WAN) module, or a Value Added Network (VAN) module, as well as various cable communication modules such as a Universal Serial Bus (USB), a High Definition Multimedia Interface (HDMI), a Digital Visual Interface (DVI), RS-232 (recommended standard232), power line communication, or plain old telephone service (POTS). The wireless communication module may include a wireless communication module that supports various wireless communication methods such as GSM (global System for Mobile Communication), CDMA (Code Division Multiple Access), WCDMA (Wideband Code Division Multiple UMTS Access), (universal mobile telecommunications system), TDMA (Time Division Multiple Access), LTE (Long Term Evolution), 4G, 5G, and 6G, in addition to a WiFi module and a Wireless broadband module. The wireless communication module may include a wireless communication interface including an antenna and a transmitter for transmitting a signal. In addition, the wireless communication module may further include a signal conversion module for modulating a digital control signal output from the processor 210-1 through the wireless communication interface into an analog wireless signal under the control of the processor 210-1. The short-range communication module is for short-range communication and can support short-range communication using at least one of Bluetooth™, RFID (Radio Frequency Identification), Infrared Data Association (IrDA), UWB (Ultra-Wideband), ZigBee, NFC (Near Field Communication), Wi-Fi (Wireless-Fidelity), Wi-Fi Direct, and Wireless USB (Wireless Universal Serial Bus) technologies.

The Gas Sensor 220-1 can detect gas emissions from the battery. In one embodiment, the detected gas may be sulfur oxides (SOx), but the system is not limited to detecting this type.

In one embodiment, the Neural Network Processing Unit 2111-1 can receive gas detection data from the Gas Sensor 220-1. In addition, the artificial neural network processing unit 2111-1 can receive sensing data. The Neural Network Processing Unit 2111-1 can train the AI model based on sensing data and detected gas data.

In one embodiment, the artificial neural network processing unit 2111-1 can evaluate the performance of the artificial intelligence model based on the change pattern predicted by the artificial intelligence model and the gas detection data. In addition, the artificial neural network processing unit 2111-1 can tune or fit the artificial intelligence model according to the performance of the artificial intelligence model.

Referring to FIG. 13B, the system **200*b*-1 is designed to detect abnormal battery conditions within a ship's marine transport environment. This system 200*b*-1 includes first device 100*b*-1, second device 210*b*-1, and gas sensor 220*b*-1. Descriptions of the second device 210*b*-1 and the gas sensor 220*b*-1 that overlap with those in FIG. 13*a*** are omitted.

The first device **110*b*-1 may include a sensor subsystem 110*b*-1, processor 120*b*-1, memory 130*b*-1, and communication module 140*b*-1**.

The sensor subsystem **110*b*-1 may include at least one of, but is not limited to, a temperature sensor, an illumination sensor, a humidity sensor, a proximity sensor, an acceleration sensor, a G-sensor, a gyroscope sensor, a motion sensor, an infrared sensor (IR sensor), a finger scan sensor, an optical sensor, an ultrasonic sensor, an infrared ray sensor, a magnetic sensor, an RGB sensor, a radar sensor, a current sensor, an environmental sensor (e.g., a barometric pressure sensor, a radiation detection sensor, a heat detection sensor, a gas detection sensor, etc.), a chemical sensor (e.g., a healthcare sensor, a biometric recognition sensor, a gas leak monitoring sensor, etc.), and a virtual sensor that performs a function corresponding to the corresponding hardware sensor. The proximity sensor detects the presence or absence of an object near a detection surface without physical contact, using electromagnetic force or infrared technology. The sensor subsystem 110*b*-1** may include at least one of these sensors, embedded within the system. Since the functions of each sensor can be intuitively inferred by those skilled in the art from their names, a detailed description will be omitted.

The first device **110*b*-1 is designed to detect abnormal conditions of the battery within the marine transport environment of a ship. In one embodiment, the processor 110*b*-1 stores program code for a neural network processing unit and a virtual sensing processing unit in memory 130*b*-1 or integrates them as firmware to execute their corresponding functions. In this disclosure, the neural network processing unit and the virtual sensing processing unit may operate as logical modules within the processor chipset 120*b*-1. For example, the neural network processing unit may be stored as program code in memory 130*b*-1 and fetched by processor 120*b*-1**, which sequentially interprets it to execute a trained machine learning model.

The second device **210*b*-1 may be positioned outside the ship's marine transport environment. For example, the second device 210*b*-1 may be a server that communicates with external devices to process information, including application servers, computing servers, database servers, file servers, game servers, mail servers, proxy servers, cloud servers and web servers. In this case, the neural network processing unit 2111*b*-1** trains machine learning models on a large scale in a server environment and calculates hyperparameter values to minimize loss functions for trained models.

The first device **110*b*-1 can store the machine learning models generated by the second device 210*b*-1 and the hyperparameter values needed to run the machine learning models. The processor 120*b*-1** interprets the program code to execute the machine learning model, enabling fast and lightweight computations equivalent to neural network inference.

Figure 14:
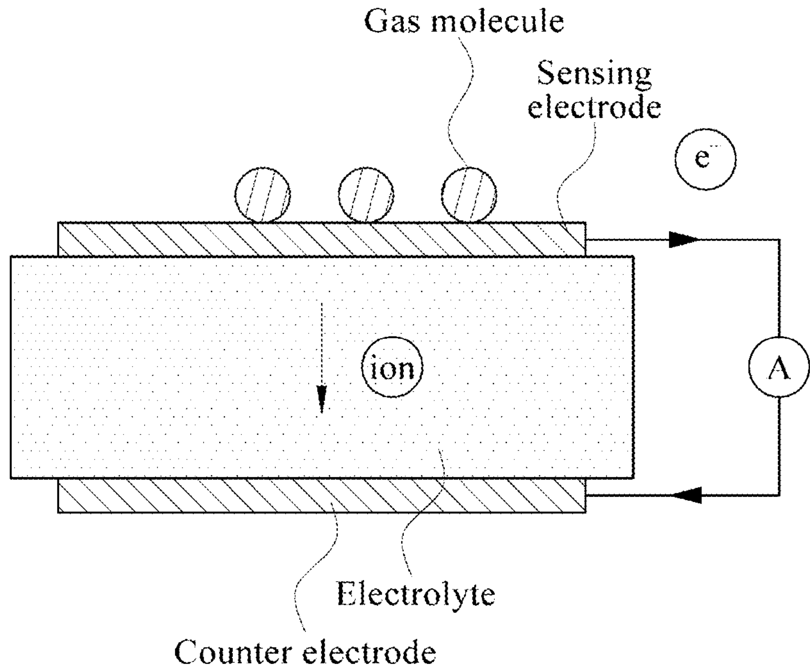
FIG. 14 is an exemplary diagram illustrating the sensing operation of a gas sensor according to the present disclosure.

FIG. 14 illustrates the sensing operation of the gas sensor.

Referring to FIG. 14, the gas sensor may include sensing electrode, counter electrode and current source. Gas molecules released due to battery damage may become trapped in the sensing electrode. When this occurs, ions can move from the sensing electrode to the counter electrode, electrons can travel through the conductive wire connected between the sensing and counter electrodes, and the current source can generate current, allowing gas leakage detection.

Figure 15:
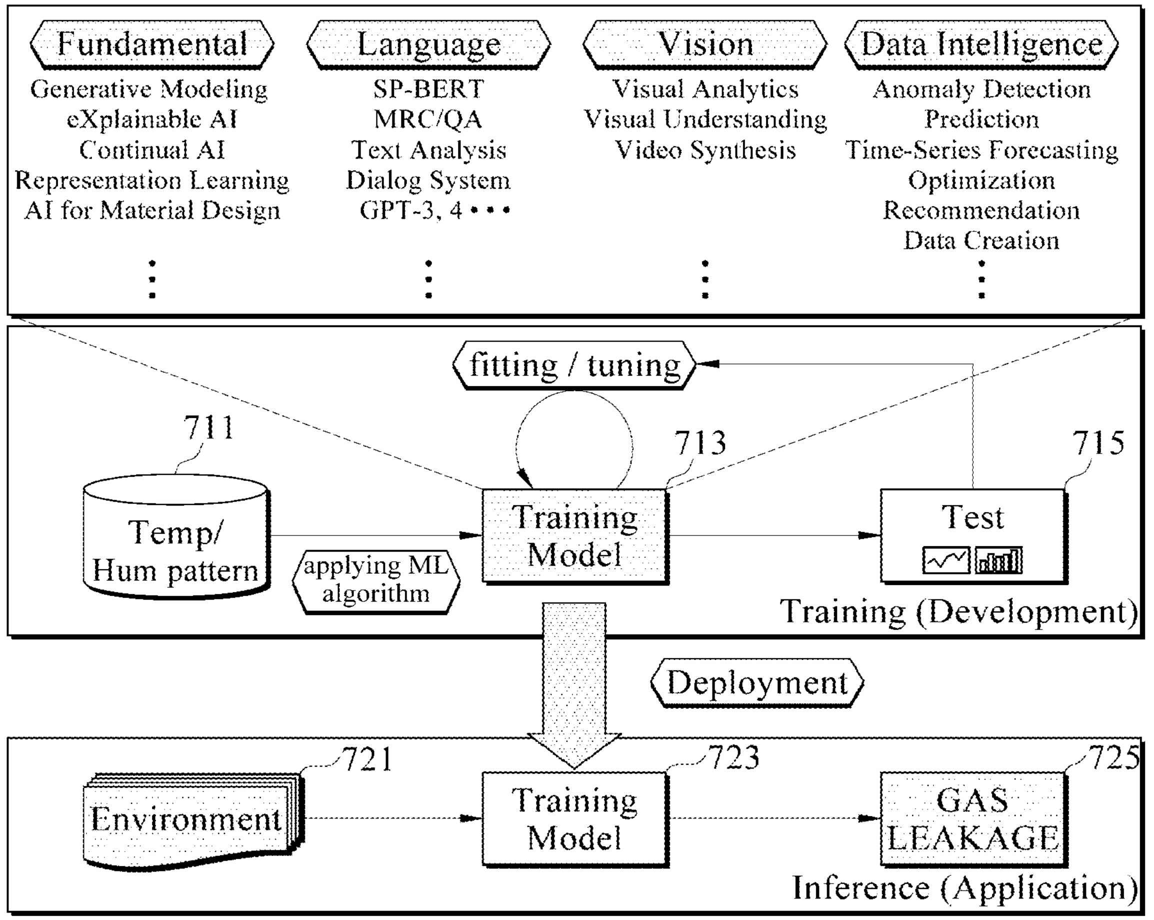
FIG. 15 is an exemplary diagram illustrating an AI model according to the present disclosure.

FIG. 15 illustrates the artificial intelligence (AI) model used in the present disclosure.

Referring to FIG. 15, in the training phase of the AI model data 711 on temperature and humidity variations corresponding to gas leakage in an enclosed space is stored in a database. The stored temperature and humidity variation data 711 can be applied to a machine learning algorithm or AI model. As data 711 is applied, the AI model is trained. The fundamentals of the training model 713 may include AI for material design, such as generative modeling, explainable AI, Continual AI, and representation learning. The language of the training model 713 may include SP-BERT, MRC/QA, Text Analysis, Dialog System, GPT-3, GPT-4, etc. The vision of the training model 713 may include Visual Analytics, Visual Understanding, Video Synthesis, etc. The data intelligence of the training model 713 may include Anomaly Detection, Prediction, Time-Series Forecasting, Optimization, Recommendation, Data Creation, etc. The amount of leaked gas detected may be obtained as the output of the training model 713. The above-described process may be repeated, and the training model 713 may be fitted and tuned based on the output of the training model 713.

In the inference stage of the artificial intelligence model after the training model 713 is developed, environmental information 721 about cargo loaded on the ship can be input into the trained model 723, and the amount of gas leakage can be predicted by the trained model 723.

Figure 16:
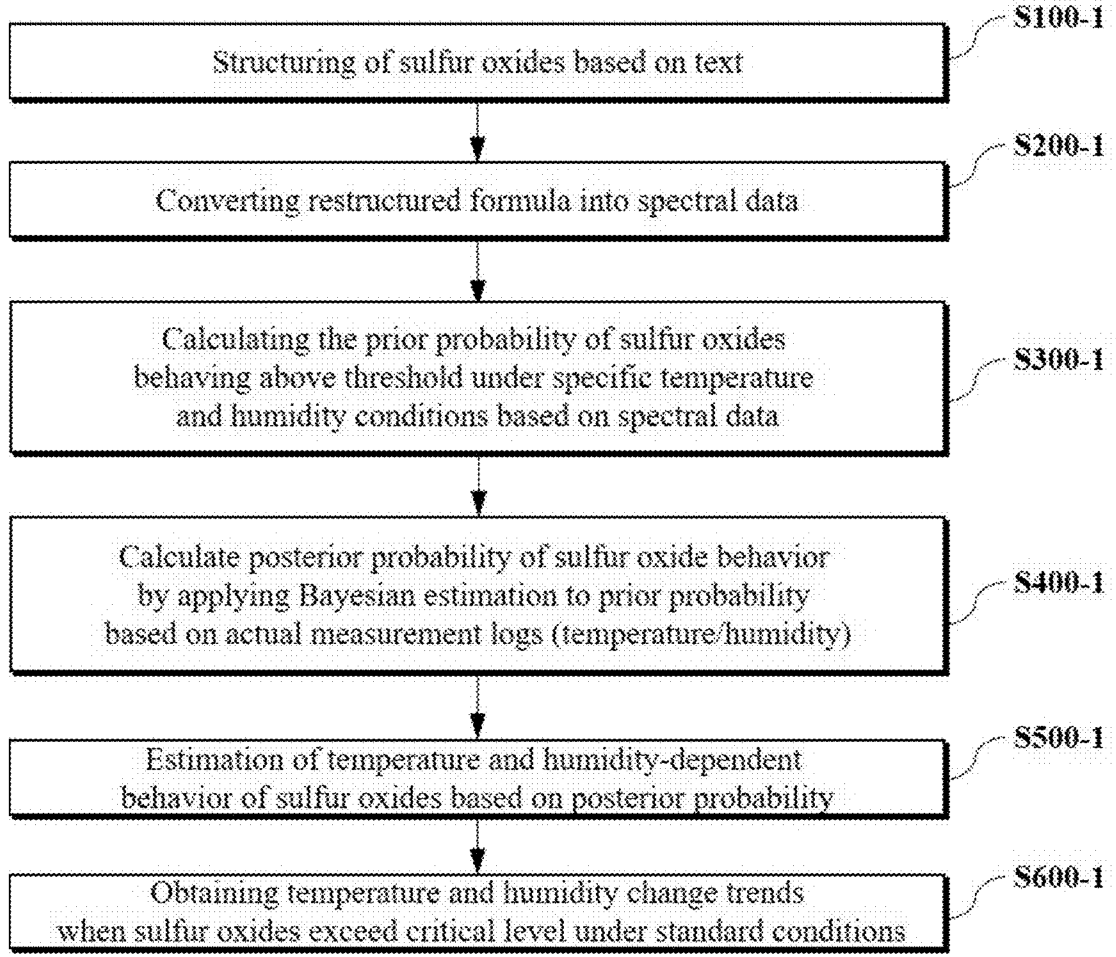
FIG. 16 is an exemplary diagram illustrating virtual sensing according to the present disclosure.

FIG. 16 illustrates the virtual sensing process in the present disclosure.

Referring step S100-1, text-based to FIG. 16, in structuring of sulfur oxides can be performed. For example, the virtual sensing processing unit 2112-1 can generate structured data by structuring the chemical structure of gas based on text. Text-based machine-interpretable text-based restructuring of the chemical structure of sulfur oxides is performed, and examples of restructuring include SMILES, molecular graph, and message passing neural network.

In step S200-1, conversion of the restructured formula into spectral data can be performed. For example, the virtual sensing processing unit 2112-1 can convert the structured data into spectral data of the restructured formula.

In step S300-1, a prior probability that sulfur oxides exceeding a threshold value will behave under specific temperature and humidity conditions based on spectral data can be calculated. For example, the virtual sensing processing unit 2112-1 can calculate the prior probability that a gas above a threshold value will behave under specific temperature and humidity conditions based on spectral data.

In step S400-1, the posterior probability that sulfur oxides will behave can be calculated by applying Bayesian estimation to the prior probability based on actual measurement logs (temperature/humidity). For example, the virtual sensing processing unit 2112-1 can calculate the posterior probability that gas will behave by applying a Bayesian estimation algorithm to the prior probability based on actually measured temperature and humidity.

In step S500-1, the temperature and humidity-specific behavior of sulfur oxides can be estimated based on the posterior probability. For example, the virtual sensing processing unit 2112-1 can estimate the temperature and humidity-specific behavior of gas based on the posterior probability.

In step S600-1, the temperature and humidity change trend when sulfur oxides above a threshold value are present under standard conditions can be acquired. For example, the virtual sensing processing unit 2112-1 can obtain trends in temperature and humidity changes when a gas exceeding a threshold level is present under standard conditions.

Figure 17:
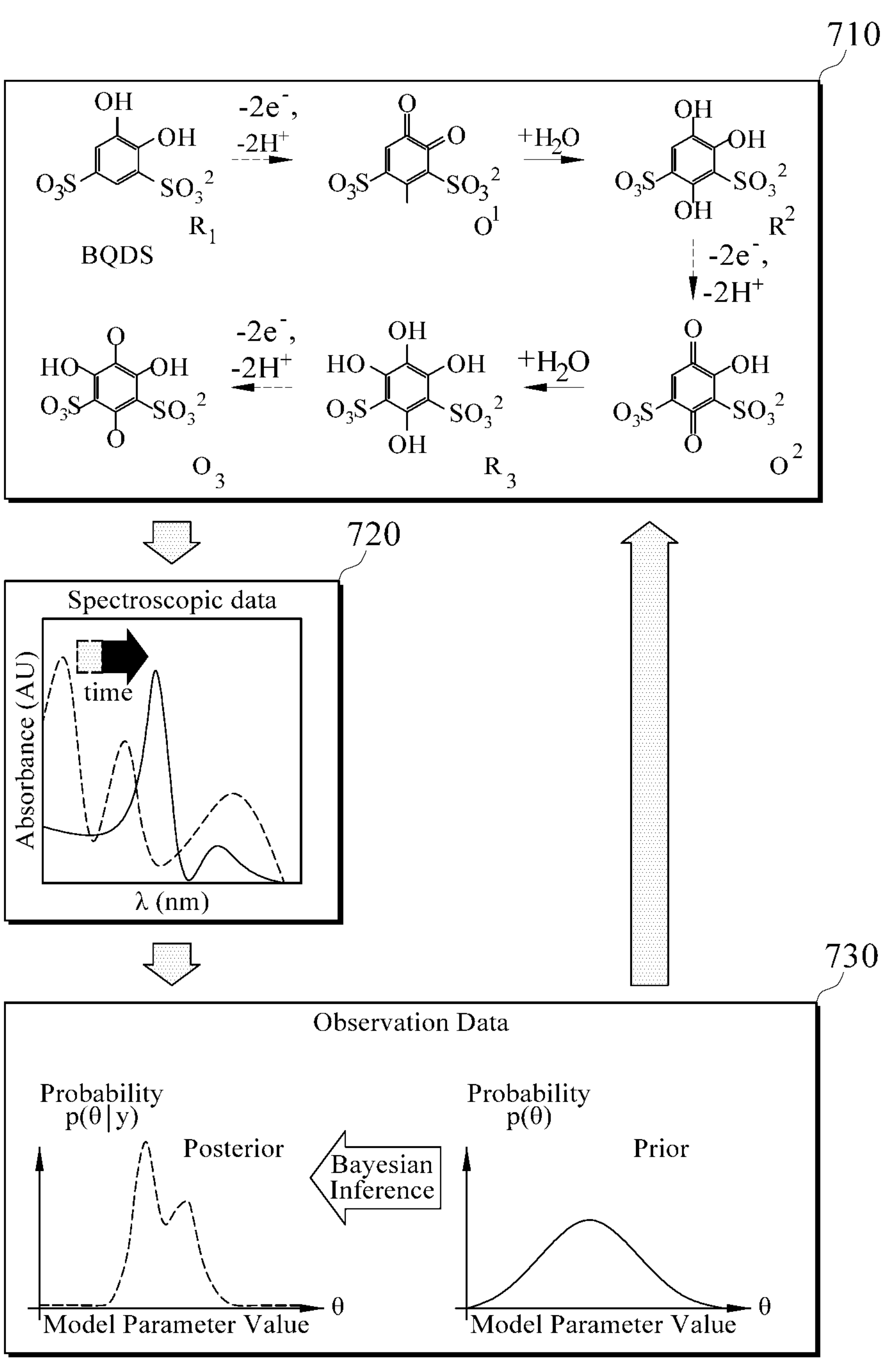
FIGS. 17 and 18 are exemplary diagrams illustrating an embodiment of FIG. 16.
Figure 18:
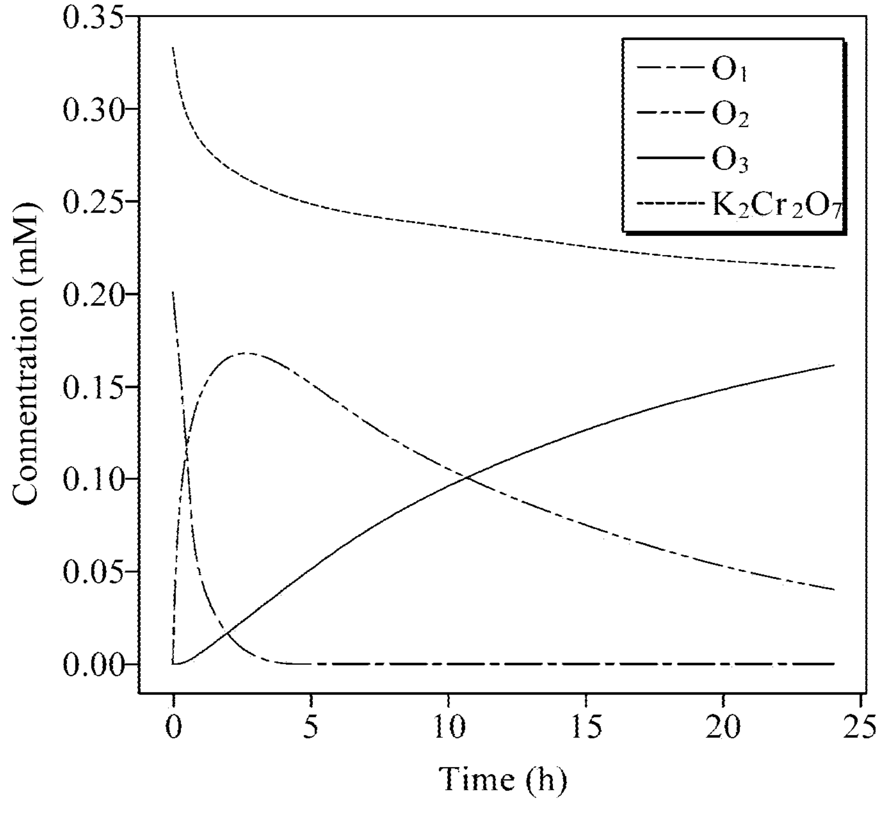

FIGS. 17 and 18 illustrate the embodiment described in FIG. 16.

Referring to FIGS. 17 and 18, the virtual sensor learns temperature/humidity variation patterns 710 in an enclosed space corresponding to gas leakage. The virtual sensor then performs a logic operation that detects specific abnormal patterns as gas leakage based on sensed data (temperature/humidity).

Redox-active organic molecules may be suitable as reactants for redox flow batteries (RFB-1) due to their low expected cost and tunable properties. However, many laboratory-scale flow cells experience rapid material degradation and capacity loss (>0.1% per day) due to chemical and electrochemical decomposition mechanisms, which hinder their commercial deployment.

This disclosure applies ultraviolet-visible (UV-Vis) spectroscopy and statistical inference methods to identify the Michael addition decomposition mechanism of 4,5-dihydroxy-1,3-benzenedisulfonic acid (BQDS), an anolyte reactant once considered promising for aqueous organic redox flow batteries. The disclosed approach uses Bayesian inference and multivariate curve resolution to quantify the uncertainty in the reaction order and rate of Michael addition, estimate the spectrum of intermediate species and establish a quantitative relationship between molecular degradation and capacity loss. This disclosure demonstrates how statistical inference can be used to quantify uncertainty while analyzing the chemical and electrochemical mechanisms underlying capacity degradation in organic redox flow batteries 720.

Considering the intermittent nature of renewable energy sources, the development of low-cost, grid-scale energy storage systems is essential for the widespread adoption of renewable energy technologies. In this context, redox flow batteries (RFBs) are structured as two electrolyte reservoirs containing redox-active charge storage materials, separated by an ion-permeable membrane or separator. Electrolytes that are pumped through reactor cells, where they periodically oxidize and reduce as the RFB charges and discharges. This architecture provides RFBs with a unique ability to scale energy storage capacity (based on electrolyte volume and charge storage species concentration) independently from power output (determined by the size of the reactor cell stack). As the energy-to-power ratio (or rated discharge duration) increases, the levelized cost of stored energy approaches the cost of the electrolyte itself. If the electrolyte is sufficiently inexpensive, the cost of stored energy could become lower than that of conventional sealed (lithium-ion) batteries.

Soluble organic and organometallic redox-active molecules have attracted considerable research interest as potential charge carriers for RFBs due to their expected low cost at scale. Therefore, in addition to low chemical cost, organic RFBs could store energy at lower costs than state-of-the-art lithium-ion systems if they possess the appropriate combination of solubility, chemical stability, and other electrochemical properties (e.g., high cell voltage and redox potential leading to fast redox kinetics). Unfortunately, most aqueous organic flow batteries suffer from hourly capacity fading rates exceeding 0.1%/day due to the rapid chemical degradation of the organic active materials. These high degradation rates make most organic RFB chemistries unsuitable for practical deployment in RFB installations that are expected to last for decades.

Understanding how reactant conversion or decomposition leads to capacity fade is an important but often challenging task, as redox-active organic molecules encompass a wide range of classes and are susceptible to a variety of decomposition mechanisms (e.g., nucleophilic attack, turgor, hydrolysis). This understanding often requires deploying novel operando-measuring tools and cycling protocols that allow deconvolution of reactant decomposition from other sources of capacity fade. For several candidate RFB charge carriers, such as quinones, iron-based organometallic complexes, and nitrogen-containing aromatic molecules, several hypotheses have been proposed for the relationship between molecular decay and capacity fade, some of which may be mutually incompatible. In other chemistries, such as those recently developed based on fluorenones, complex equilibria may exist between species in different redox and protonation states whose influence on capacity retention is not yet fully understood. This task requires new techniques to discern the probability or relative contribution of various hypothesized mechanisms to the capacity fade observed in flow cells. In particular, understanding and rigorously quantifying the extent to which experimentally collected data confirm or challenge specific hypotheses about the chemical and electrochemical causes of capacity fade is critical to developing organic RFB chemistries.

This problem can be helped by broadly approaching the statistical learning of physical models and their parameters from experimental observations as an estimation or inference task 730. Estimation can be centered around the concept of regression, where the goal is to find optimal parameter values so that model predictions best fit (explain) observations. However, these optimal values are typically single values and do not quantify the uncertainty that is affected by the quantity and quality of observations. In contrast, inference can find a probabilistic solution to convey the degree of uncertainty about the various possible explanations that could have caused the observed data. Inference is typically performed according to the axioms of probability and the Bayesian theorem, where an initial prior uncertainty distribution can be appropriately updated to a posterior uncertainty distribution in light of newly acquired observations. The Bayesian update rule can naturally incorporate new data that may be sequentially specified over time and provide a consistent representation of the aggregate evidence.

Bayesian inference can also be advantageous in accommodating sparse and noisy indirect measurements, incorporating datasets from diverse sources and of varying quality, and injecting domain knowledge and expert opinion into the learning process. In addition to parameter inference, the Bayesian framework can be extended to model selection, allowing for comparison of different hypotheses and assumptions represented by different model structures and parameterizations (e.g., different reaction mechanisms) as a 'package'.

Bayesian inference and related probabilistic techniques have been applied to a number of problems in electrocatalysis and battery science, including failure prediction and life-extending charging protocol development for lithium-ion batteries, analyte labeling, model/variable selection and parameter estimation for lithium-ion battery electrodes, electrochemical cell design, Tafel slope interpretation, and materials discovery.

In this disclosure, Bayesian inference and multivariate curve resolution-alternating least squares (MCR-ALS) are applied to spectroscopically characterize the decomposition of oxidized 4,5-dihydroxy-1,3-benzenedisulfonic acid (BQDS) or its ortho-hydroquinone derivative, tyrone, previously investigated as a cathode electrolyte material in aqueous RFBs. While Bayesian inference has broad applicability, MCR-ALS may be particularly suited to spectrophotometry because it uses iterative optimization under well-defined physical constraints to decompose the mixed signal of a multicomponent system into its pure components. MCR-ALS can be applied to understand the decomposition of multicomponent chemical systems via optical absorbance, where the absorbance at a given wavelength can be linearly proportional to the concentration of each component. Previous disclosures have shown that oxidized BQDS is susceptible to a self-discharge reaction with water, known as Michael addition/attack, resulting in the formation of a series of hydroxyl-substituted para-hydroquinone species with lower redox potentials than BQDS. However, the specific rate of Michael addition and whether this rate is modified under operating cycling conditions are unknown. This information is crucial for establishing a quantitative relationship between reactant decay/conversion and capacity decay.

Referring to FIG. 17, a Bayesian model can be selected to identify the most plausible kinetic regime for the decay of BQDS based on UV-visible spectrophotometry of a sacrificial oxidizer. By applying Bayesian parameter inference and MCR-ALS to the UV-vis data, uncertainty quantification estimates for the Michael attack rates of BQDS both in situ and within an operational flow cell can be obtained. By applying MCR-ALS to the spectroscopic data obtained from an operational BQDS-containing flow cell, the UV-vis spectra of all oxidation and Michael attack products can be individually separated. The present disclosure applies Bayesian model selection and inference and multivariate curve resolution techniques to the spectroscopic data obtained from in situ and operational flow cells to elucidate and quantify the Michael attack kinetics of BQDS. The section "Spectroscopic Measurements of Michael Attack of BQDS" reports the experimental details and measurements of the Michael attack of BQDS via UV-vis spectrophotometry as a function of the concentration of the sacrificial oxidizer. In "Model Selection and Uncertainty Using Bayesian Inference and Multivariate Curve Resolution Analysis-Quantified Michael Attack Rates", application of Bayesian model selection and inference of associated decay rate constants to UV data can be made. In "Spectrophotometric Analysis of BQDS Decomposition in an Operating Flow Cell" section, experimental details of BQDS oxidation and Michael attack during electrochemical cycling can be reported. In "Estimation of Decay Rate Constants and UV-Vars Spectra of Oxidation Products" section, MCR-ALS can be applied to operando UV-Vars data to extract spectra for each oxidation/intermediate product as well as associated decay rate constants. Finally, in the "Discussion" section, the results can be confirmed by calculating the reaction energies for the Michael addition to BQDS using nuclear magnetic resonance (NMR) analyses and density functional theory (DFT) calculations. All experimental and computational methods can be reported in the "Methods" section. The present disclosure can elucidate and distinguish between chemical and electrochemical mechanisms of capacity decay in organic RFBs using statistical inference techniques, and can be used to understand molecular transformations over various time scales in other flow cell-based electrochemical applications.

Referring to FIG. 18, the expected temporal evolution in the concentrations of all oxidizing species can be represented when the initial concentrations of K2Cr2O7 and BQDS are 0.4 and 0.2 mM, respectively, assuming first-order kinetics for Michael attack and the values of k1 and k2 set with the highest posterior probability. In addition, the computational evolution of the oxidizing species for the cases of initial 0.4 mM [K2Cr2O7] and initial 0.2 mM [BQDS] can be depicted in FIG. 18 assuming Bayesian inference rate constants.

Figure 19:
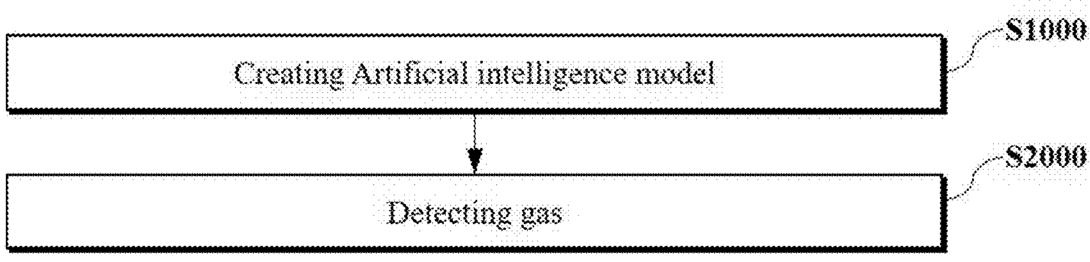
FIG. 19 is a flowchart illustrating a method according to the present disclosure.

FIG. 19 is a flowchart for explaining a method according to the present disclosure.

Referring to FIG. 19, the method according to the present disclosure may be a method for sensing and correcting the maritime transportation environment of a ship. The method may include an artificial intelligence model generation step S1000-1 and a gas detection step S2000-1.

The artificial intelligence model generation step S1000-1 is a step for generating an artificial intelligence model that learns a change pattern of temperature and humidity in a closed space included in sensing data.

The gas detection step S2000-1 is a step for detecting a change in temperature and humidity in a closed space as a gas leak occurring in a battery corresponding to the temperature and humidity in the closed space based on the artificial intelligence model and sensing data received from the ship.

Meanwhile, the disclosed embodiments may be implemented in the form of a recording medium that stores instructions executable by a computer. The instructions may be stored in the form of program codes, and when executed by a processor, may generate a program module to perform operations of the disclosed embodiments. The recording medium may be implemented as a computer-readable recording medium. Computer-readable recording media include all types of recording media that store instructions that can be decoded by a computer. For example, there may be ROM (Read Only Memory), RAM (Random Access Memory), magnetic tape, magnetic disk, flash memory, optical data storage devices, etc.

As described above, the disclosed embodiments have been described with reference to the attached drawings. Those skilled in the art to which the present disclosure pertains will understand that the present disclosure can be implemented in different forms from the disclosed embodiments without changing the technical idea or essential features of the present disclosure. The disclosed embodiments are exemplary and should not be construed as limiting.

Embodiment 2

One aspect of the present disclosure provides a system for detecting an abnormal state of a battery included in a ship within a maritime transport environment of the ship, comprising: an artificial neural network processor for generating an artificial intelligence model that learns a change pattern of temperature and humidity within a sealed space included in sensing data generated from a sensing device; and a virtual sensing processor for receiving the sensing data of the OTQ from the outside, and detecting, based on the artificial intelligence model and the sensing data of the OTQ received from the ship, a change in the temperature and humidity within the sealed space as a gas leak generated from the battery corresponding to the temperature and humidity within the sealed space.

The system, further comprises a gas sensor for detecting gas generated from the battery, and characterized in that the artificial neural network processor trains the artificial intelligence model based on the sensing data and the gas detection data detected by the gas sensor.

The artificial neural network processor evaluates the performance of the artificial intelligence model based on the change pattern predicted by the artificial intelligence model and the gas detection data, and tunes the artificial intelligence model according to the performance of the artificial intelligence model.

The virtual sensing processor generates structured data by structuring the chemical structure of the gas based on text.

The virtual sensing processor converts the structured data into spectral data of the restructured formula.

The virtual sensing processor calculates prior probability that a gas above a threshold value will behave under specific temperature and humidity conditions based on the spectral data.

The virtual sensing processor calculates a posterior probability that the gas will behave by applying a Bayesian estimation algorithm to the prior probability based on actually measured temperature and humidity.

The virtual sensing processor is characterized in that it estimates the behavior of the gas according to temperature and humidity based on the posterior probability.

The virtual sensing processor is characterized in that it obtains the trend of temperature and humidity changes when a gas exceeding a threshold exists under standard conditions.

In a method for sensing and correcting the maritime transport environment of a ship, the method comprises: an artificial intelligence model generation step of generating an artificial intelligence model that learns a change pattern for temperature and humidity in a closed space included in sensing data generated from a sensing device; and a gas detection step of detecting, based on the artificial intelligence model and the sensing data received from the ship, the change in temperature and humidity in the closed space as a gas leak occurring in the battery corresponding to the temperature and humidity in the closed space.

One aspect of the present disclosure also provides a computer program stored in a recording medium that executes the method of the present disclosure in combination with hardware.

What is claimed is:

1. A device for sensing and correcting a marine transport environment of a ship, comprising:

an inertial sensor, configured to measure a roll of the ship; and a processor, configured to:

receive sensing information regarding temperature and humidity inside a cargo on the ship from an external source, verify the temperature and the humidity of the sensing information based on at least one of a Global Positioning System (GPS) indicating a location of the ship and an Estimated Time of Arrival (ETA) at a destination of the ship along a navigation route, and correct transport environment information including the temperature and the humidity based on the verification results, wherein the processor comprises:

a verifier, configured to:

measure a current location of the ship based on GPS, verify the temperature and the humidity inside the cargo by comparing predicted values at the current location of the ship with a predefined first reference value, measure ETA along the navigation route based on externally received input, and verify the temperature and the humidity inside the cargo by comparing predicted values at the current ETA with a predefined second reference value;

a computation unit, configured to calculate correction parameters based on the measured temperature and humidity and reference values; and a corrector, configured to correct the transport environment based on the verification results from the verifier and the correction parameters from the computation unit.

2. The device of claim 1, wherein:

the verifier is configured to primarily estimate predicted temperature, humidity, and ETA along the navigation route;

the computation unit is configured to calculate correction parameters based on the predicted temperature, humidity, and ETA along the navigation route; and the corrector is configured to update time and humidity variations and updates average temperature changes by longitude.

3. The device of claim 1, wherein:

the verifier is configured to verify temperature and humidity by comparing actual log values with estimated values for each navigational trajectory, and when an error occurs in the temperature and humidity log, update the error data, the computation unit is configured to calculate the correction parameters in response to temporal errors, and the corrector is configured to update navigational information based on error cause analysis, using temperature, humidity, and temporal error data.

4. The device of claim 3, further comprising a memory configured to store lookup tables (LUTs) containing error data measured for each navigational route of the ship, error data measured for each location where the ship can be positioned, and error data measured for each cargo loaded on the ship, wherein the verifier is configured to verify the temperature, and the humidity based on multiple LUTs stored in the memory.

5. The device of claim 4, wherein the inertial sensor comprises an Inertial Measurement Unit (IMU) including:
a gyroscope configured to measure angular velocity of the ship,
an accelerometer configured to measure acceleration of the ship, and
a magnetometer configured to measure geomagnetic properties of the ship.

6. The device of claim 5, further comprising:
a salinity sensor configured to measure salt levels around the ship at sea to track corrosive effects on precision machinery,
wherein the verifier is configured to verify the temperature, and the humidity based on data sensed by the salinity sensor.

7. The device of claim 6, further comprising:
a communication module configured to transmit ship information, including corrected temperature and humidity data, to external devices via a communication network.

8. A method for sensing and correcting a marine transport environment of a ship, comprising:
receiving sensing information on temperature and humidity inside a cargo contained in the ship from outside;
measuring a roll of the ship;
verifying the temperature and the humidity of the sensing information based on at least one of a GPS indicating a location of the ship and an ETA at a destination on the ship along a navigation route; and
correcting transport environment information including the temperature and the humidity based on the verification results;
measuring a current location of the ship based on GPS;
verifying the temperature and the humidity inside the cargo by comparing predicted values at the current location of the ship with a predefined first reference value;
measuring ETA along the navigation route based on externally received input, and
verifying the temperature and the humidity inside the cargo by comparing predicted values at the current ETA with a predefined second reference value;
computing, which calculates correction parameters based on the measured temperature and humidity and reference values; and
correcting, which corrects the transport environment based on the verification results and the correction parameters.

9. A non-transitory computer-readable recording medium storing a computer program, which, when combined with hardware, executes the method of claim 8.

* * * * *